US006515968B1

(12) United States Patent
Combar et al.

(10) Patent No.: US 6,515,968 B1
(45) Date of Patent: *Feb. 4, 2003

(54) INTEGRATED INTERFACE FOR REAL TIME WEB BASED VIEWING OF TELECOMMUNICATIONS NETWORK CALL TRAFFIC

(75) Inventors: Curtis T. Combar, Woodland Park, CO (US); Carol Y. Devine, Colorado Springs, CO (US); Robert A. Pfister, Colorado Springs, CO (US)

(73) Assignee: WorldCom, Inc., Clinton, MS (US)

(*) Notice: Subject to any disclaimer, the term of this patent is extended or adjusted under 35 U.S.C. 154(b) by 0 days.

This patent is subject to a terminal disclaimer.

(21) Appl. No.: 09/159,504

(22) Filed: Sep. 24, 1998

Related U.S. Application Data

(63) Continuation-in-part of application No. 08/587,381, filed on Jan. 17, 1996, now Pat. No. 5,825,769, which is a continuation-in-part of application No. 08/405,988, filed on Mar. 17, 1995, now Pat. No. 5,610,915.
(60) Provisional application No. 60/060,655, filed on Sep. 26, 1997.

(51) Int. Cl.[7] .................................................. H04J 3/02
(52) U.S. Cl. ...................................................... 370/252
(58) Field of Search ................................. 370/259, 360, 370/359, 377, 378, 384, 388, 389, 398, 400, 241, 244, 252, 253, 351, 352, 401, 465; 379/220, 209, 387, 204, 201, 91.02, 91.01, 93.07, 93.09, 93.14, 93.21, 207.01, 207.14, 219, 220.01, 221.07, 221.08, 221.09, 221.1, 221.11, 221.13, 225, 230, 231; 709/203, 204, 218, 219, 226, 227

(56) References Cited

U.S. PATENT DOCUMENTS 4,160,129 A 7/1979 Peyser et al.
4,345,315 A 8/1982 Cadotte et al.
4,817,050 A 3/1989 Komatsu et al.

(List continued on next page.)

FOREIGN PATENT DOCUMENTS

| EP | 0 809 387 A2 | 5/1997 |
| JP | 09064870 A | 3/1997 |
| WO | WO97/11443 | 3/1997 |

(List continued on next page.)

OTHER PUBLICATIONS

*Computer Networks*, Andrew S. Tanenbaum, pp. 410–412.

(List continued on next page.)

*Primary Examiner*—Dang Ton

(57) ABSTRACT

A system and method for providing both telecommunications network statistical reporting functions and reporting on a call by call detail basis, over the public Internet. A "TRAFFICVIEW" Server (TVS) system and Real time monitoring system is integrated with a web/Internet based reporting system infrastructure and is responsive to instructions provided by subscribers over the internet so that reports may be provided on a given time period, at a given frequency and in a particular format. Standard traffic call detail reports are delivered to the subscriber via a browser based graphical user interface. The graphical user interface provides all reporting functions the subscriber is entitled to. A subscriber may obtain a static view of the traffic for a special service call number by communicating with the TVS. Moreover, a remote subscriber may be provided via a browser based workstation GUI with data files containing raw call details and statistics in a predetermined format. Alternately, a remote subscriber may communicate with a real time statistics (RTM) system over the public Internet enabling the subscriber to monitor the operation of the network, as it relates to calls directed to the subscribers special service call numbers, in real time.

15 Claims, 28 Drawing Sheets

U.S. PATENT DOCUMENTS

| | | |
|---|---|---|
| 4,893,248 A | 1/1990 | Pitts et al. |
| 4,972,504 A | 11/1990 | Daniel, Jr. et al. |
| 5,041,972 A | 8/1991 | Frost |
| 5,075,771 A | 12/1991 | Hashimoto |
| 5,131,020 A | 7/1992 | Liebesny et al. |
| 5,136,707 A | 8/1992 | Block et al. |
| 5,223,699 A | 6/1993 | Flynn et al. |
| 5,228,076 A | 7/1993 | Hopner et al. |
| 5,245,533 A | 9/1993 | Marshall |
| 5,262,760 A | 11/1993 | Iwamura et al. |
| 5,285,494 A | 2/1994 | Sprecher et al. |
| 5,287,270 A | 2/1994 | Hardy et al. |
| 5,313,598 A | 5/1994 | Yamakawa |
| 5,315,093 A | 5/1994 | Stewart |
| 5,325,290 A | 6/1994 | Cauffman et al. |
| 5,327,486 A | 7/1994 | Wolff et al. |
| 5,361,259 A | 11/1994 | Hunt et al. |
| 5,369,571 A | 11/1994 | Metts |
| 5,452,446 A | 9/1995 | Johnson |
| 5,475,836 A | 12/1995 | Harris et al. |
| 5,481,542 A * | 1/1996 | Logston et al. ............. 370/442 |
| 5,483,596 A | 1/1996 | Rosenow et al. |
| 5,490,060 A | 2/1996 | Malec et al. |
| 5,491,779 A | 2/1996 | Bezjian |
| 5,526,257 A | 6/1996 | Lerner |
| 5,530,744 A | 6/1996 | Charalambous et al. |
| 5,537,611 A | 7/1996 | Rajagopal et al. |
| 5,539,734 A | 7/1996 | Burwell et al. |
| 5,548,726 A | 8/1996 | Pettus |
| 5,551,025 A | 8/1996 | O'Reilly et al. |
| 5,555,290 A | 9/1996 | McLeod et al. |
| 5,563,805 A | 10/1996 | Arbuckle et al. |
| 5,566,351 A | 10/1996 | Crittenden et al. |
| 5,586,260 A | 12/1996 | Hu |
| 5,602,918 A | 2/1997 | Chen et al. |
| 5,610,915 A * | 3/1997 | Elliott et al. ................. 370/259 |
| 5,621,727 A | 4/1997 | Vaudreuil |
| 5,623,601 A | 4/1997 | Vu |
| 5,630,066 A | 5/1997 | Gosling |
| 5,649,182 A | 7/1997 | Reitz |
| 5,650,994 A | 7/1997 | Daley |
| 5,659,601 A | 8/1997 | Cheslog |
| 5,666,481 A | 9/1997 | Lewis |
| 5,671,354 A | 9/1997 | Ito et al. |
| 5,689,645 A | 11/1997 | Schettler et al. |
| 5,692,030 A | 11/1997 | Teglovic et al. |
| 5,692,181 A | 11/1997 | Anand et al. |
| 5,694,546 A | 12/1997 | Reisman |
| 5,696,906 A | 12/1997 | Peters et al. |
| 5,699,403 A | 12/1997 | Ronnen |
| 5,699,528 A | 12/1997 | Hogan |
| 5,706,502 A | 1/1998 | Foley et al. |
| 5,708,780 A | 1/1998 | Levergood et al. |
| 5,710,882 A | 1/1998 | Svennevik et al. |
| 5,721,908 A | 2/1998 | Lagarde et al. |
| 5,721,913 A | 2/1998 | Ackroff et al. |
| 5,727,129 A | 3/1998 | Barrett et al. |
| 5,734,709 A | 3/1998 | DeWitt et al. |
| 5,734,831 A | 3/1998 | Sanders |
| 5,742,762 A | 4/1998 | Scholl et al. |
| 5,742,763 A | 4/1998 | Jones |
| 5,742,768 A | 4/1998 | Gennaro et al. |
| 5,742,905 A | 4/1998 | Pepe et al. |
| 5,745,754 A | 4/1998 | Lagarde et al. |
| 5,754,830 A | 5/1998 | Butts et al. |
| 5,757,900 A | 5/1998 | Nagal et al. |
| 5,764,756 A | 6/1998 | Onweller |
| 5,768,501 A | 6/1998 | Lewis |
| 5,774,660 A | 6/1998 | Brendel et al. |
| 5,778,178 A | 7/1998 | Arunachalam |
| 5,778,377 A | 7/1998 | Marlin et al. |
| 5,781,550 A | 7/1998 | Templin et al. |
| 5,781,632 A | 7/1998 | Odom |
| 5,787,160 A | 7/1998 | Chaney et al. |
| 5,787,412 A | 7/1998 | Bosch et al. |
| 5,790,780 A | 8/1998 | Brichta et al. |
| 5,790,789 A | 8/1998 | Suarez |
| 5,790,797 A | 8/1998 | Shimada et al. |
| 5,790,809 A | 8/1998 | Holmes |
| 5,793,694 A | 8/1998 | Rogers et al. |
| 5,793,762 A | 8/1998 | Penners et al. |
| 5,793,964 A | 8/1998 | Rogers et al. |
| 5,796,393 A | 8/1998 | MacNaughton et al. |
| 5,799,154 A | 8/1998 | Kuriyan |
| 5,802,320 A | 9/1998 | Baehr et al. |
| 5,805,803 A | 9/1998 | Birrell et al. |
| 5,812,533 A | 9/1998 | Cox et al. |
| 5,812,654 A | 9/1998 | Anderson et al. |
| 5,812,750 A | 9/1998 | Dev et al. |
| 5,815,080 A | 9/1998 | Taguchi |
| 5,815,665 A | 9/1998 | Teper et al. |
| 5,819,225 A | 10/1998 | Eastwood et al. |
| 5,819,271 A | 10/1998 | Mahoney et al. |
| 5,825,769 A * | 10/1998 | O'Reilly et al. ............ 370/360 |
| 5,826,029 A | 10/1998 | Gore, Jr. et al. |
| 5,826,269 A | 10/1998 | Hussey |
| 5,832,519 A | 11/1998 | Bowen et al. |
| 5,835,084 A | 11/1998 | Bailey et al. |
| 5,844,896 A | 12/1998 | Marks et al. |
| 5,845,067 A | 12/1998 | Porter et al. |
| 5,845,267 A | 12/1998 | Ronen |
| 5,848,233 A | 12/1998 | Radia et al. |
| 5,848,396 A | 12/1998 | Gerace |
| 5,848,399 A | 12/1998 | Burke |
| 5,850,517 A | 12/1998 | Verkler et al. |
| 5,852,810 A | 12/1998 | Sotiroff et al. |
| 5,852,812 A | 12/1998 | Reeder |
| 5,862,325 A | 1/1999 | Reed et al. |
| 5,867,495 A | 2/1999 | Elliott et al. |
| 5,870,558 A | 2/1999 | Branton, Jr. et al. |
| 5,875,236 A | 2/1999 | Jankowitz et al. |
| 5,877,759 A | 3/1999 | Bauer |
| 5,881,237 A | 3/1999 | Schwaller et al. |
| 5,883,948 A | 3/1999 | Dunn |
| 5,884,032 A | 3/1999 | Bateman et al. |
| 5,892,900 A | 4/1999 | Ginter et al. |
| 5,907,681 A | 5/1999 | Bates et al. |
| 5,909,679 A | 6/1999 | Hall |
| 5,909,682 A | 6/1999 | Cowan et al. |
| 5,915,001 A | 6/1999 | Uppaluru |
| 5,920,542 A | 7/1999 | Henderson |
| 5,923,016 A | 7/1999 | Fredregill et al. |
| 5,930,764 A | 7/1999 | Melchione et al. |
| 5,930,804 A | 7/1999 | Yu et al. |
| 5,933,142 A | 8/1999 | LaStrange et al. |
| 5,937,165 A | 8/1999 | Schwaller et al. |
| 5,938,729 A | 8/1999 | Cote et al. |
| 5,949,976 A | 9/1999 | Chappelle |
| 5,953,389 A | 9/1999 | Pruett et al. |
| 5,956,714 A | 9/1999 | Condon |
| 5,958,016 A | 9/1999 | Chang et al. |
| 5,960,411 A | 9/1999 | Hartman et al. |
| 5,961,602 A | 10/1999 | Thompson et al. |
| 5,963,925 A | 10/1999 | Kolling et al. |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,864 A | 11/1999 | Jagadish et al. |
| 5,982,891 A | 11/1999 | Ginter et al. |
| 5,983,350 A | 11/1999 | Minear et al. |

| | | |
|---|---|---|
| 5,991,733 A | 11/1999 | Aleia et al. |
| 5,991,746 A | 11/1999 | Wang |
| 5,991,806 A | 11/1999 | McHann, Jr. |
| 5,995,948 A | 11/1999 | Whitford et al. |
| 5,999,525 A | 12/1999 | Krishnaswamy et al. |
| 5,999,965 A | 12/1999 | Kelly |
| 5,999,972 A | 12/1999 | Gish |
| 5,999,973 A | 12/1999 | Glitho et al. |
| 6,003,079 A | 12/1999 | Friedrich et al. |
| 6,006,265 A | 12/1999 | Rangan et al. |
| 6,011,844 A | 1/2000 | Uppaluru et al. |
| 6,012,090 A | 1/2000 | Chung et al. |
| 6,014,647 A | 1/2000 | Nizzari et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,044,144 A | 3/2000 | Becker et al. |
| 6,044,362 A | 3/2000 | Neely |
| 6,049,602 A | 4/2000 | Foladare et al. |
| 6,049,789 A | 4/2000 | Smorodinsky |
| 6,052,450 A | 4/2000 | Allison et al. |
| 6,058,170 A | 5/2000 | Jagadish et al. |
| 6,058,381 A | 5/2000 | Nelson |
| 6,064,667 A | 5/2000 | Gisby et al. |
| 6,065,002 A | 5/2000 | Knotts et al. |
| 6,065,059 A | 5/2000 | Shieh et al. |
| 6,072,493 A | 6/2000 | Driskell et al. |
| 6,073,105 A | 6/2000 | Sutcliffe et al. |
| 6,073,122 A | 6/2000 | Wool |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A * | 7/2000 | He et al. ................ 380/25 |
| 6,088,796 A | 7/2000 | Cianfrocca et al. |
| 6,091,808 A | 7/2000 | Wood et al. |
| 6,094,655 A | 7/2000 | Rogers et al. |
| 6,104,704 A | 8/2000 | Buhler et al. |
| 6,105,131 A | 8/2000 | Carroll |
| 6,108,700 A | 8/2000 | Maccobee et al. |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A | 9/2000 | Taskett |
| 6,115,693 A | 9/2000 | McDonough et al. |
| 6,115,737 A | 9/2000 | Ely et al. |
| 6,119,109 A | 9/2000 | Muratani et al. |
| 6,122,258 A | 9/2000 | Brown |
| 6,128,624 A | 10/2000 | Papierniak et al. |
| 6,130,933 A | 10/2000 | Miloslavsky |
| 6,131,095 A | 10/2000 | Low et al. |
| 6,131,116 A | 10/2000 | Riggins et al. |
| 6,134,584 A | 10/2000 | Chang et al. |
| 6,137,869 A * | 10/2000 | Voit et al. ................ 370/352 |
| 6,145,001 A | 11/2000 | Scholl et al. |
| 6,154,744 A * | 11/2000 | Kennes et al. ................ 707/10 |
| 6,161,102 A | 12/2000 | Yanagihara et al. |
| 6,161,126 A | 12/2000 | Wies et al. ................ 709/203 |
| 6,161,128 A | 12/2000 | Smyk |
| 6,173,311 B1 | 1/2001 | Hassett et al. |
| 6,205,456 B1 | 3/2001 | Nakao |
| 6,212,506 B1 | 4/2001 | Shah et al. |
| 6,212,558 B1 | 4/2001 | Antur et al. |
| 6,240,450 B1 | 5/2001 | Sharples et al. |
| 6,253,239 B1 | 6/2001 | Shklar et al. |
| 6,286,050 B1 | 9/2001 | Pullen et al. |
| 6,292,481 B1 | 9/2001 | Voit et al. |

FOREIGN PATENT DOCUMENTS

| | | |
|---|---|---|
| WO | WO 97/16911 | 5/1997 |
| WO | WO 97/23988 | 7/1997 |
| WO | WO 98/19472 | 5/1998 |
| WO | WO 99/01826 | 1/1999 |

OTHER PUBLICATIONS

"XIIR6.3 (Broadway) Overview", http://www.x.org/broadway.htm.

"Stac Unveils Windows NT 4.0 and Web Browser Support in New ReachOut 7" http://www.stac.com/news/pressrel/pr_ro7_unveil.html.

Quadri et al., Hewlett–Packard and Cisco Systems, "Internet Usage Platform" White Paper.

"HP and Cisco Deliver Internet Usage Platform and Billing and Analysis Solutions, New Platform and Solutions Allow ISPs and Carriers to Offer Value–added Services", Copyright 1998 Cisco Systems, Inc. http://www.cisco.com/warp/public/146/pressroom/1998/apr98/28.html.

HP Smart Internet, "Transform User Data Into Revenue", Copyright Hewlett–Packard Company, 1999.

HP Smart Internet Usage Analysis Solution, "Transform User Data Into Competitive Advantage", Copyright Hewlett–Packard Company, 1999.

HP/Cisco, Internet Usage Platform, "Transforming Internet Services Into Revenue" ©Hewlett–Packard Co. 1998.

"Release Note for Netflow FlowCollector Release 2.0," © Jul. 1998 and "Release Notes for Netflow FlowAnalyzer Release 1.0 " © Sep. 1997.

HP Invent, "Capturing the Usage Billing Advantage", Copyright 1994–2001, Hewlett Packard http://www.hp.com/communications/usage/infolibrary/whitepapers/dsforum_print.html.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro–Tel's Microcall for Windows 95/NT", Teleconnect, vol. 15, No. 12, p. 35, Dec. 1997.

"Cryptography and the Internet", www.echonyc.com/~ysue/crypt.html, 1995.

Lee et al., "Supporting Multi–User, Multi–Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

Kenney, Kathleen, "American Management Systems Launces Internet–Based Customer Care and Billing Tool for Telecom Firms", PR Newswire, New York, Oct. 9, 1996, extracted from http://proquest.umi.com on internet Feb. 28, 2002.

Morgan, Rick, "When Used Right, Internet can be Effective Marketing Tool", Madison Capital Times, Madison, WI, Nov. 8, 1996, extracted from http://proquest.umi.com on internet on Feb. 28, 2002.

Edwards, Morris, "The Electronic Commerce Juggernaut", Communication News, Nokomis, Sep. 1997, vol. 34, Issue 9, extracted from http://proquest.umi.com on Internet on Feb. 28, 2002.

Meterology; Databases, "Inforonics offers controlled access to Web Meterology", Information Today, Apr. 97, vol. 14, Issue 4 p53, 2p. This article reports that Inforonics has developed a controlled access gateway to MGA (Meteorolgical and Geoastrophysica).

Rosen,Michele,"BPCS steps into new millennium", Midrange Systems; Spring House; May 10, 1996. This article informs about the new release of BPCS Client/Server Software as the most extensive upgrade of the product since 1980s. It incorporates onject tech.

Inoue et al., "Secure Mobile IP Using Security Primitives", IEEE 1997.

Chapman, D. Brent et al., "Building Internet Firewalls", Nov. 1995, O'Reilly & Associates, p. 58.

He, Taniguchi, "Internet Traffic Control and Management Architecture", IEEE, Oct. 22–24, 1998, pp. s46–03–1—s46–03–5.

Sixth International Conference on Network Protocols, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

Biggs, M., "Help for the Web enhances customer support, reduces help desk load"*Inforworld,* Jun. 16, 1997, v. 19, No. 24, pp. 82+.

Burch, B., "AT&T, MCI to release new management tools", *Network World,* Jan. 17, 1994, p. 19.

Low, C., "Integrating Communication Services", *IEEE Communication Magazine,* Jun. 1997, pp. 164–169.

"McAfee's New 'Self–Service' Help Desk Web Suite Makes PCs Help Desk–Ready", Newswire Association Inc., Oct. 13, 1997.

Niemeyer, R., "Using Web Technologies in Two MLS Environments: A Security Analysis." *IEEE,* pp. 205–214, 1997.

Porter, T., "MCI offers tracking system: Direct Dispatch lets users eye problems remotely", *Service News,* Apr. 1994, p. 17.

Shklar, L., et al., "MetaMagic: Generating Virtual Web Sites Through Data Modeling,"http://www.scope.gmd.de/info/www6/posters/714/poster714.html.

Vizard, M. et al., "MCI to Pilot Convergence Billing Service", *InforWorld,* v. 18, Issue 37, Sep. 9, 1996.

Yager, T., "Mixed Messages", *UNIX Review,* v. 16, n. 2, p. 29, Feb. 1998.

"Carriers Improve Net Management Services", *Communications Week,* May 2, 1994, p. 74.

"Network management; new software platform enhances network management capabilities; MCI ServiceView offers greater cost savings, increased flexibility.", Product Announcement, *Edge,* Oct. 2, 1995, on & about AT&T, v. 10, n. 375, p. 11(1).

"New software platform enhances network management capabilities . . . ", *Business Wire,* Sep. 28, 1995 p. 9281122.

"User's Guide: Microsoft Access", Microsoft Corporation, 1994, pp. 378,594,599, 630–632 (13).

Jainschigg, J., "Billing confirmed: this easy–to–use box turns guest calls into revenue." *Teleconnect,* vol. 12, No. 9, p. 39(4).

* cited by examiner

| 31-Aug-1994 | MCI 800 Trafficview | Profile Selection |
|---|---|---|

```
┌─Profile──┬─Description──────────────────┐
│ DANTEST  │ INITIAL MONITORING PROFILE   │
│ DEFAULT  │ Default Profile              │
│ KAREN    │ KAREN'S DEMO                 │
└──────────┴──────────────────────────────┘
```

To Select a Profile Use the Arrow Keys and Press Enter, Ctrl_A Add Profile
Ctrl_D Delete Profile, Ctrl_R Refresh Profile List, Ctrl_U Update Profile
Ctrl_Z Exit, '*' Indicates Profile is Currently in Use and Can Only Be Viewed Profile Selection Screen

FIG. 15(a)

31-Aug-1994      MCI 800 Trafficview      Profile Maintenance: ADD

Profile: TESTUSER                Description: THIS IS A TEST PROFILE
Initial Mode: R                  Polling Interval: 5 Minutes ┌─────────────────────────── 800 Numbers ───────────────────────────┐
│ *123-4567   *123-6567   *123-7567   123-8567   123-9567   124-0567   124-1567 │
│  234-5678    234-7678    *           234-9678   235-0678   235-1678   235-2678 │
│  345-6789    345-8789    345-9789    346-0789   346-1789   346-2789   346-3789 │
│  456-7890    457-4890    567-8901    568-5901   678-9012   679-6012   989-8989 │
│  990-0989    990-1989    990-2989    990-3989   990-4989   990-5989   999-1110 │
│  999-1116    999-1117    999-1123    999-1124   999-1130   999-1131   999-1137 │
│  999-1138    999-1144    999-1145    999-1146   999-1147   999-1148   999-1149 │
│  999-3110    999-3111    999-3112    999-3113   999-3114   999-5120   999-5121 │
│  999-5122    999-5126    999-5140    999-6114   999-6128   999-6142   999-7116 │
│  999-7130                                                                       │
└─────────────────────────────────────────────────────────────────────┘

Ctrl_E Enter Phone Numbers for Profile Directly, Ctrl_F Maintain Top Five
Ctrl_A Add Profile, Ctrl_P Switch to Profile Selection Screen, Ctrl_Z Exit
Ctrl_T Toggle (Select/Deselect) All Phone Numbers for Profile Adding a Profile

FIG. 15(b)

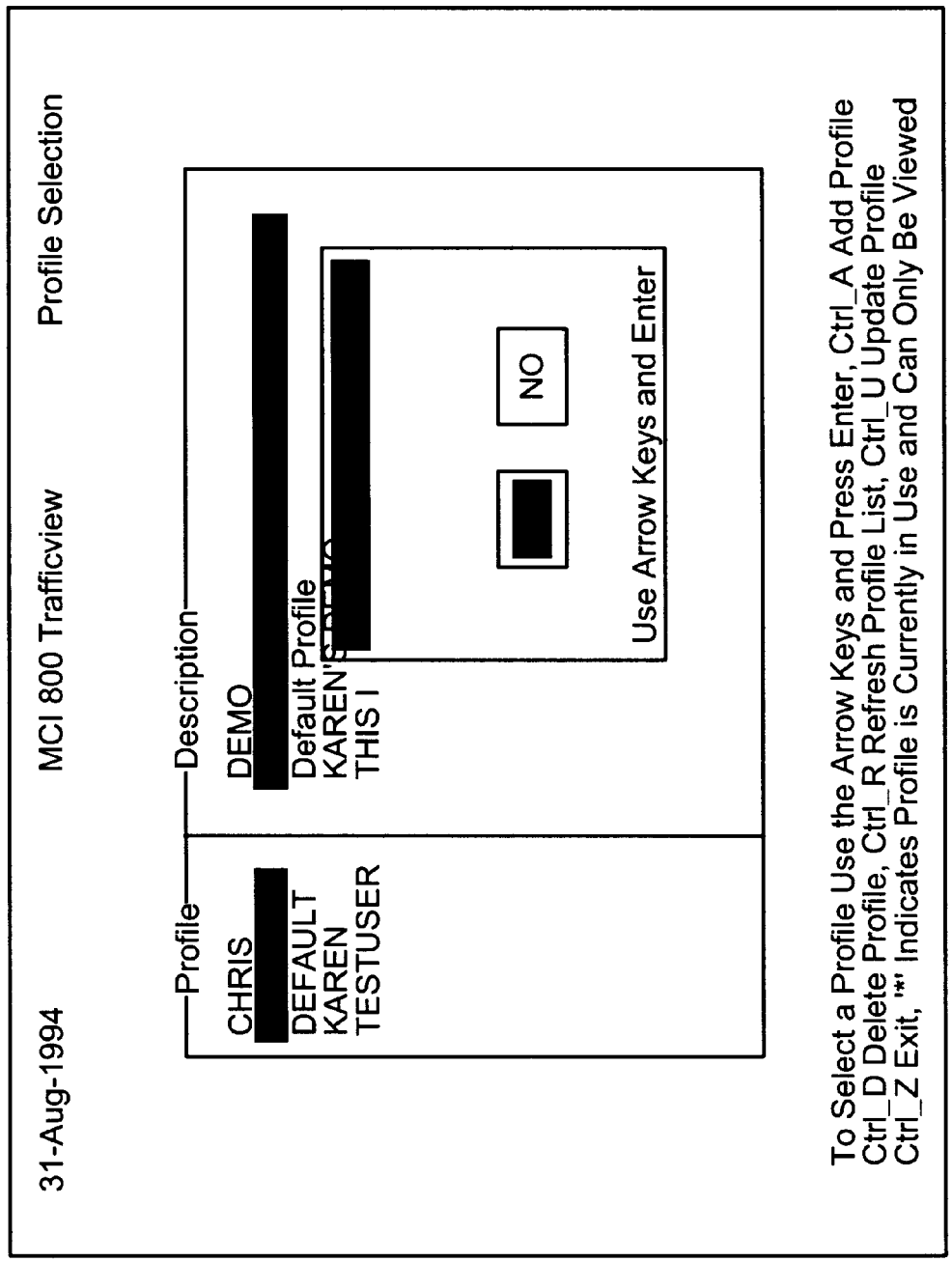
FIG. 15(c) Deleting a Profile

31-Aug-1994     MCI 800 Trafficview     Profile Maintenance: ADD

Profile: TESTUSER     Description: THIS IS A TEST PROFILE
Initial Mode: R

```
*123-4567  *123-6567                      124-0567  124-1567
 234-5678   234-7678                      235-1678  235-2678
 345-6789   345-8789                      346-2789  346-3789
 456-7890   457-4890                      679-6012  989-8989
 990-0989   990-1989                      990-5989  999-1110
 999-1116   999-1117                      999-1131  999-1137
 999-1138   999-1144                      999-1148  999-1149
 999-3110   999-3111                      999-5120  999-5121
 999-5122   999-5126                      999-6142  999-7116
 999-7130
```

Add/Delete Profile Phone Numbers

Profile: TESTUSER

Phone Number: (800) 999-1131

[ ADD ] [ DELETE ] [ EXIT ]

Type in Phone Number and Select
Action (Add, Delete) or Exit

Ctrl_E Enter Phone Numbers for Profile Directly, Ctrl_F Maintain Top Five
Ctrl_A Add Profile, Ctrl_P Switch to Profile Selection Screen, Ctrl_Z Exit
Ctrl_T Toggle (Select/Deselect) All Phone Numbers for Profile

Adding a Single 800 Number

FIG. 15(d)

| 31-Aug-1994 | MCI 800 Trafficview | Profile Maintenance: ADD |
|---|---|---|

Profile: TESTUSER           Description: THIS IS A TEST PROFILE
Initial Mode: R

```
*123-4567  *123-6567                              124-0567  124-1567
 234-5678   234-7678                              235-1678  235-2678
 345-6789   345-8789                              346-2789  346-3789
 456-7890   457-4890                              679-6012  989-8989
 990-0989   990-1989                              990-5989  999-1110
 999-1116   999-1117                              999-1131  999-1137
 999-1138   999-1144                              999-1148  999-1149
 999-3110   999-3111                              999-5120  999-5121
 999-5122   999-5126                              999-6142  999-7116
 999-7130
```

Enter Top 5 Phone Numbers

Profile: TESTUSER (800) 123-4567
(800) 123-6557
(800)   -
(800)   -
(800)   -

[ OK ]    [ QUIT ]

Type in Phone Numbers,
Use Arrow Keys and Enter

Ctrl_E Enter Phone Numbers for Profile Directly, Ctrl_F Maintain Top Five
Ctrl_A Add Profile, Ctrl_P Switch to Profile Selection Screen, Ctrl_Z Exit
Ctrl_T Toggle (Select/Deselect) All Phone Numbers for Profile Top 5 Number Selection

FIG. 15(e)

31-Aug-1994          MCI 800 Trafficview          Real-Time Statistics

Profile: DANTEST     Description: INITIAL MONITORING PROFILE

Polling: 5 Minute Interval - Since 19:43 31-Aug-1994 - Current 19:38 → 19:43

|  |  | SHORT | DIDN'T | DIDN'T |
|--|--|-------|--------|--------|
|  | INCOMP |  |  |  |
| INCOMP | C: | 0 |  |  |
| TOTALS | T: | 0 |  |  |
| 123-4567 | C: | 0: |  |  |
|  | T: | 0: |  |  |
| 345-8789 | C: | 0: |  |  |
|  | T: | 0: |  |  |

Profile: DANTEST
Enter Polling Interval: 10    [Cancel]

Enter New Poll Interval

Ctrl_I Inquriy Mode, Ctrl_P Profile Selection, Ctrl_E New Poll Int, Ctrl_Z Exit
Ctrl_T New Poll Start Time, Ctrl_U Summary Statistics, Ctrl_H Other Statistics Changing Polling Interval

FIG. 15(f)

31-Aug-1994          MCI 800 Trafficview          Real-Time Statistics

Profile: DANTEST          Description: INITIAL MONITORING PROFILE

Polling: 5 Minute Interval - Since 19:40 31-Aug-1994 - Current 19:35 → 19:40

|  | INCOMP | SHORT | DIDN'T | DIDN'T |
|---|---|---|---|---|
| INCOMP C: | 0 | | | |
| TOTALS T: | 0 | | | |
| 123-4567 C: | 0: | | | |
| T: | 0: | | | |
| 345-8789 C: | 0: | | | |
| T: | 0: | | | |

Profile: DANTEST
Start Time: 19:40 31-Aug-1994

[ OK ]   [ Quit ]

Enter New Start Time for Polling

Ctrl_I Inquiry Mode, Ctrl_P Profile Selection, Ctrl_E New Poll Int, Ctrl_Z Exit
Ctrl_T New Poll Start Time, Ctrl_U Summary Statistics, Ctrl_H Other Statistics
Enter Starting Time, HH:HH for inquiry Changing Poll Start Time

FIG. 15(g)

| 31-Aug-1994 | MCI 800 Trafficview | | Real-Time Statistics | | | | |
|---|---|---|---|---|---|---|---|
| Profile: DANTEST | Description: INITIAL MONITORING PROFILE | | | | | | |
| Polling: 5 Minute Interval - Since 00:43 31-Aug-1994 - Current 19:38 → 19:43 | | | | | | | |
| | | | | | | —DURATION— | |
| | ATTEMPTS | COMP | INCOMP | OTHER | DTO | AVG | TOTAL |
| INCOMP    C: | 0 | 0 | 0 | 0 | 0 | 0.0 | 0.0 |
| TOTALS    T: | 3 | 0 | 3 | 0 | 0 | 0.0 | 0.0 |
| 123-4567  C: | 0 | 0 | 0 | 0 | 0 | 0.0 | 0.0 |
|           T: | 3 | 3 | 3 | 0 | 0 | 0.0 | 0.0 |
| 345-8789  C: | 0 | 0 | 0 | 0 | 0 | 0.0 | 0.0 |
|           T: | 0 | 0 | 0 | 0 | 0 | 0.0 | 0.0 |

Ctrl_I Inquriy Mode, Ctrl_P Profile Selection, Ctrl_E New Poll Int, Ctrl_Z Exit
Ctrl_T New Poll Start Time, Ctrl_U Summary Statistics, Ctrl_H Other Statistics

Summary Statistics Screen

FIG. 15(h)

| | INCOMP | SHORT CALL | DIDN'T WAIT | DIDN'T ANSWER |
|---|---|---|---|---|
| INCOMP C: | 0 | 0 | 0 | 0 |
| TOTALS T: | 3 | 3 | 0 | 0 |
| 123-4567 C: | 0 | 0 | 0 | 0 |
| T: | 3 | 3 | 0 | 0 |
| 345-8789 C: | 0 | 0 | 0 | 0 |
| T: | 0 | 0 | 0 | 0 |

31-Aug-1994   MCI 800 Trafficview   Real-Time Statistics

Profile: DANTEST   Description: INITIAL MONITORING PROFILE

Polling: 5 Minute Interval - Since 00:43 31-Aug-1994 - Current 19:38 → 19:43

Ctrl_I Inquriy Mode, Ctrl_P Profile Selection, Ctrl_E New Poll Int, Ctrl_Z Exit
Ctrl_T New Poll Start Time, Ctrl_U Summary Statistics, Ctrl_H Other Statistics Incomplete Summary Screen

FIG. 15(i)

31-Aug-1994          MCI 800 Trafficview          Real-Time Statistics

Profile: DANTEST          Description: INITIAL MONITORING PROFILE

Polling: 5 Minute Interval - Since 00:43 31-Aug-1994 - Current 19:38 → 19:43

|  |  | OTHERS | ID CODES | TAILOR COVERAGE | EQUIP/NTWK CONGESTION |
|---|---|---|---|---|---|
| OTHER TOTALS | C: | 0 | 0 | 0 | 0 |
|  | T: | 0 | 0 | 0 | 0 |
| 123-4567 | C: | 0 | 0 | 0 | 0 |
|  | T: | 0 | 0 | 0 | 0 |
| 345-8789 | C: | 0 | 0 | 0 | 0 |
|  | T: | 0 | 0 | 0 | 0 |

Ctrl_I Inquriy Mode, Ctrl_P Profile Selection, Ctrl_E New Poll Int, Ctrl_Z Exit
Ctrl_T New Poll Start Time, Ctrl_U Summary Statistics, Ctrl_H Other Statistics Other Summary Screen

FIG. 15(j)

31-Aug-1994          MCI 800 Trafficview          Real-Time Statistics

Profile: DANTEST     Description: INITIAL MONITORING PROFILE

Phone Number: (800) 123-4567 Disposition: * Time Range: 00:00 ➤ 23:59

Calling Number City —— Connect —— Dur     Serv Location  Disp     DNIS         DTO
(719) 282-1860   001  08-31-1994 04:00 12:00   H9999999   Ring  NoAns 1233589

Ctrl_I Activate Inquiry, Ctrl_P Select Profile, Ctrl_R Real_Time Stats, Ctrl_Z Exit Call Detail Inquiry Screen

FIG. 15(k)

Call Disposition Selection

31-Aug-1994          MCI 800 Trafficview          Real-Time Statistics

Profile: DANTEST     Description: INITIAL MONITORING PROFILE

Phone Number: (800) 123-4567 Disposition: * Time Range: 00:00 ➔ 00:00
┌─────────────────────────── Call Detail ───────────────────────────┐
Calling Numb
(719) 282_1   Calling Number    (719) 282-1860      Country Code 001
              Connect Time      08-31-1994 04:00    Call Duration 12:00
              Actual Term       H9999999            Intended term
              Disposition       Short Call
              DTO Flag                              City    COLORDOSPG
                                                    State   CO
              Outpulse Digits 2532523                Suppcode  1233589
└───────────────────────────────────────────────────────────────────┘

Ctrl_I Activate Inquiry, Ctrl_P Select Profile, Ctrl_R Real_Time Stats, Ctrl_Z Exit CDR Detail Display

FIG. 15(m)

INTEGRATED INTERFACE FOR REAL TIME WEB BASED VIEWING OF TELECOMMUNICATIONS NETWORK CALL TRAFFIC

CROSS-REFERENCE TO RELATED APPLICATIONS

This is a continuation-in-part of U.S. patent application Ser. No. 08/587,381 filed Jan. 17, 1996, entitled SYSTEM AND METHOD THEREFOR OF VIEWING IN REAL TIME CALL TRAFFIC OF A TELECOMMUNICATIONS NETWORK which has issued into U.S. Pat. No. 5,825,769; which, in turn, is a continuation-in-part of U.S. patent application Ser. No. 08/405,988, filed Mar. 17, 1995 and entitled SYSTEM AND METHOD THEREFOR OF VIEWING CALL TRAFFIC OF A TELECOMMUNICATIONS NETWORK which has issued into U.S. Pat. No. 5,610,915. This application additionally claims the benefit of U.S. Provisional Appln. No. 60/060,655, filed Sep. 26, 1997.

FIELD OF THE INVENTION

The present invention relates generally to special service telephone call processing such as 800/8xx, 900 and "VNET" calls in a telecommunications network, and more particularly, to a World Wide Web/Internet enabled apparatus and methodology for viewing network call traffic information and call statistics in real-time.

BACKGROUND OF THE INVENTION

Commonly assigned U.S. Pat. No. 5,537,611 issued Jul. 10, 1996 discloses a network management scheme for special service calls which allows the management of a telecommunications network to oversee the network to ascertain traffic surges and provide traffic controls to alleviate network congestion. In particular, this patent discloses the utilization of a Data Access Point (DAP) for storing information relating to different special service call numbers, information relating to subscribers who subscribe to the various services, and translation tables that provide the data needed to translate a special service call number into a real call number associated with a particular network switch. A processor associated with the DAP, referred to as a DAP Traffic Statistics (DTS), converts the collected traffic data into statistics data and forwards the same to a compiler processor of an Integrated Network Management System (INMS). The INMS provides reports containing the compiled statistics data for the special service call number to subscribers and the management of the telecommunications network. With the information from the INMS, a subscriber could read just the parameters for a special service call number and reallocate the calls made to the call number to different destination stations. The management of the network, at the same time, can review the information from the DTS and reroute traffic in the network to avoid congestion or call blocking caused by any one of the special service call numbers.

Conventionally, subscribers' access to their telecommunications network call traffic information is made via a dial-up connection to the INMS mid range computer server from a customer owned personal computer or work station. This connection frequently, although not always, emulates a terminal addressable by the mid range computer system. The dial-up access requires custom software on the customer workstation to provide dial-up services, communication services, emulation and/or translation services and generally some resident custom form of the INMS mid range computer application to enable the interface therewith.

There are several problems associated with this approach:

First, the aforementioned software is very hardware specific, and customers generally have a wide range of workstation vendors, which requires extensive inventory for distribution, and generally, intensive customer hand holding through initial setup and installation before reliable and secure sessions are possible. If the customer hardware platform changes through an upgrade, most of these issues need renegotiation.

Secondly, dial-up, modem, and communications software interact with each other in many ways which are not always predicable to a custom application, requiring extensive trouble shooting and problem solving for an enterprise desiring to make the legacy system available to the customer, particularly where various telephone exchanges, dialing standards or signal standards are involved.

Third, when an enterprise desires to make more than one system available to the customer, the custom application for one legacy system or mid range application is not able to connect to a different legacy system, and the customer must generally logoff and logon to switch from one to the other. The delivery technology used by the two legacy systems may be different, requiring different interface standards, and different machine level languages may be used by the two systems, as for example, the 96 character EBSDIC language used by IBM, and the 127 character ASCII language used by contemporary personal computers.

Finally, the security and entitlement features of the various legacy systems may be completely different, and vary from system to system and platform to platform.

As subscriber's desire an open access route to their 800/900 and VNET call traffic information and related statistics, it is desired to provide connectivity to enterprise mid range or legacy systems over the public Internet, as the Internet provides access connectivity world wide via the TCP/IP protocol, without need to navigate various telephone exchanges, dialing standards or signal standards.

BRIEF DESCRIPTION OF THE PRESENT INVENTION

The present invention is one component of an integrated suite of customer network management and report applications using the internet and a World Wide Web ("WWW" or "Web") Web browser paradigm. Introduced to the communications industry as "nMCI Interact" the integrated suite of Web-based applications provides an invaluable tool for enabling customers of a telecommunications enterprise to manage their telecommunication assets, quickly and securely, from anywhere in the world.

The popularity of the public Internet provides a measure of platform independence for the customer, as the customer can run their own Internet web-browser and utilize their own platform connection to the Internet to enable service. This resolves many of the platform hardware and connectivity issues in the customers favor, and lets the customer choose their own platform and operating system. Web-based programs can minimize the need for training and support since they utilize existing client software which the user has already installed and already knows how to use. Further, if the customer later changes that platform, then, as soon as the new platform is Internet enabled, service is restored to the customer. The connectivity and communications software burden is thus resolved in favor of standard and readily available hardware and the browser and dialup software used by the public Internet connection.

An Internet delivered paradigm obviates many of the installation and configuration problems involved with initial setup and configuration of a customer workstation, since the custom application required to interface with the legacy system can be delivered via the public Internet and run within a standard web-browser, reducing application compatibility issues to browser compatibility issues.

For the enterprise, the use of off-the-shelf web browsers by the customer significantly simplifies the enterprise burden by limiting the client development side to screen layouts and data presentation tools that use a common interface enabled by the web browser. Software development and support resources are thus available for the delivery of the enterprise legacy services and are not consumed by a need for customer support at the work station level.

The present invention thus satisfies the above mentioned needs by providing an internet enabled and Web-based remote interface that allows a customer to open and monitor trouble tickets relating to network events on the enterprise network.

Parent case U.S. Ser. No. 08/587,381, now U.S. Pat. No. 5,825,769 describes the TrafficView System server ("TVS") which comprises an integration of the existing DTS system and an MCI Traffic Statistics (MTS) system which is a service that provides subscribers with insight into their call attempts and completions, beyond current DTS reporting capabilities. The TVS system is thus comprehensive, providing subscribers with information related to their special service calls, for example 800/900, call disposition statistics and call detail information.

The source of data for the MTS system is 800/900 Call Detail Records (CDRs) generated by the various network switches. These CDRs are collected by network Adjunct Processors (APs), associated with corresponding ones of the network switches. Once collected, the CDRs are delivered to the MTS system for immediate processing. Upon receipt of the CDRs from the APs, the MTS system will forward periodically, for example hourly, the call statistics to the TVS. The MTS system stores multiple hourly CDRs for each of the special service numbers.

For call by call details, the TVS system is supplied with Enhanced Call Detail Records (ECDR) by the MTS system. For the current embodiment of the instant invention, the statistical data is sent to the TVS system on an hourly basis, and the ECDR data is sent to the TVS system in near real time. These records are used to generate additional different call detail reports, known as "unpriced data" reports. In addition, these ECDRs are the source of a Real Time Traffic Monitor (RTM) system that enables a subscriber of the system to view in real time the operation of the network, i.e. the statistics relating to the calls directed to the special service call number(s) of the subscriber. In particular, upon signing onto the RTM service, a subscriber is given a password by the management of the network so that through a web browser, the subscriber may access directly the TVS system via the public Internet. The ECDR data sent to the TVS system can then be accessed directly by the subscriber in substantially real time so that the ongoing operation of the network, at least with respect to the subscriber's special service call number(s), can be monitored by the subscriber. The subscriber can accordingly reallocate his resources, for example redirecting calls to his special service call number to different locations where the operators of the subscriber are located.

The present invention provides an Internet enabled and Web-based remote interface that allows a customer to retrieve their unpriced call traffic detail information and call disposition statistics in the form of reports, as well as access and view their real-time call traffic details relating to their special service call numbers.

To access their unpriced call traffic data and/or real-time call traffic details at a user's remote customer workstation, a user first logs on to the internet through any internet access route, and then logs on to the enterprise Web-server. After verification of the customer's entitlements to use the system, the Web-server downloads an available suite of services for that customer, which includes the TrafficView system tool, which is offered by the assignee of the present invention as the "Traffic Monitor" service or "Unpriced Reporting." This service is provided to the customer through a service object that is invoked and maintained by a browser based backplane, and which calls, as needed, other objects, including objects to enable graphical displays of data to the customer. From the opening screen, the customer may select the opportunity to view their real-time traffic, and the Web-server will then download the service program object to enable this.

At the time of customer verification, the enterprise customer service management system has obtained certain information relating to an RTM profile maintained on a TVS server. This RTM profile information automatically prepopulates at least one field in a dialog involved in the opening of a unpriced data reporting screen or traffic monitor screen.

In this prepopulation process, data included within the customer profile is automatically entered into a field of a particular dialog. Through this prepopulation, the amount of required user input is minimized, thereby increasing customer usability.

In the preferred embodiment, a number of different unpriced call detail reports may be generated which are delivered via a novel web-based report generation and delivery system integrated within nMCI Interact.

A feature of the report generation and delivery system for unpriced reporting, is the ability to customize the reports a subscriber is entitled to receive. For example, a subscriber can obtain the call details of a special service call subscribed by him for a particular period of time instead of real time. Furthermore, the subscriber can download a data file comprising the raw call details of the special service call for a particular period of time.

The present invention thus provides a web/Internet based reporting tool for generating traffic statistics data as specialized reports and/or data files to subscribers who subscribe to the special service call processing service provided by the network; and, via the public internet:

i) provides the ability to download call statistics from a database of the TVS system so that a subscriber can format and design his own reports;

ii) provides a subscriber with the ability to instruct the system to provide reports on a particular given time through a particular method;

iii) provides reports to subscribers that include greater call details of their subscribed special service calls than other previous systems and methods; and iv) provides real time enhanced call detail records to subscribers so that a subscriber can monitor in real time the operation of the network, so as to be able to effect the necessary changes expeditiously.

BRIEF DESCRIPTION OF THE FIGURES

The above-mentioned aspects and advantages of the present invention will become more apparent and the invention itself will be best understood by reference to the following description of the invention taken in conjunction with the accompanying drawings, wherein:

FIG. 15(a) is an exemplar profile selection screen;

FIG. 15(b) is an exemplar adding profile screen;

FIG. 15(c) is an exemplar delete a profile screen;

FIG. 15(d) is an exemplar adding a single 800 number screen;

FIG. 15(e) is an exemplar top five number selection screen;

FIG. 15(f) is an exemplar changing polling interval screen;

FIG. 15(g) is an exemplar changing poll start time screen;

FIG. 15(h) is an exemplar summary statistics screen;

FIG. 15(j) is an exemplar other summary screen;

FIG. 15(k) is an exemplar call detail inquiry screen;

FIG. 15(l) is an exemplar call disposition selection screen;

FIG. 15(m) is an exemplar call detail record display screen; and,

DETAILED DESCRIPTION OF THE PRESENT INVENTION

The popularity and wide spread adoption of the public Internet provides a measure of platform independence for customers who desire to connect to an enterprise system, as the customer can run their own Internet web-browser and utilize their own platform connection to the Internet to enable service. This resolves many of the platform hardware and connectivity issues in the customers favor, and lets the customer choose their own workstation platform and operating system. Web-based programs can minimize the need for training and support since they utilize existing customer browser software which the user has already installed and already knows how to use. Any issues relating to connectivity and communications have already been resolved in favor of standard and readily available hardware and the browser and dialup software used by the public Internet connection.

An Internet delivered paradigm for customer services obviates many of the installation and configuration problems involved with initial setup and configuration of a dial-up customer workstation, since the custom application required to interface with the legacy system can be delivered via the public Internet and run within a standard web-browser, reducing application compatibility issues to browser compatibility issues.

ARCHITECTURAL OVERVIEW OF THE WEB-ENABLED SYSTEM

The web-enabled system in which the present "Traffic View and Real Time Monitor Service" invention is found is a suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;
2) a network architecture defining the physical network needed to satisfy the security and data volume requirements of the networkMCI System;
3) a data architecture detailing the application, back-end or legacy data sources available for networkMCI Interact; and
4) an infrastructure covering security, order entry, fulfillment, billing, self-monitoring, metrics and support.

Each of these common component areas will be generally discussed herein below. A detailed descriptions of each of these components can be found in a related, co-pending U.S. patent application Ser. No. 09/159,695 entitled INTEGRATED CUSTOMER INTERFACE SYSTEM FOR COMMUNICATIONS NETWORK MANAGEMENT, the disclosure of which is incorporated herein by reference thereto.

Figure 1:
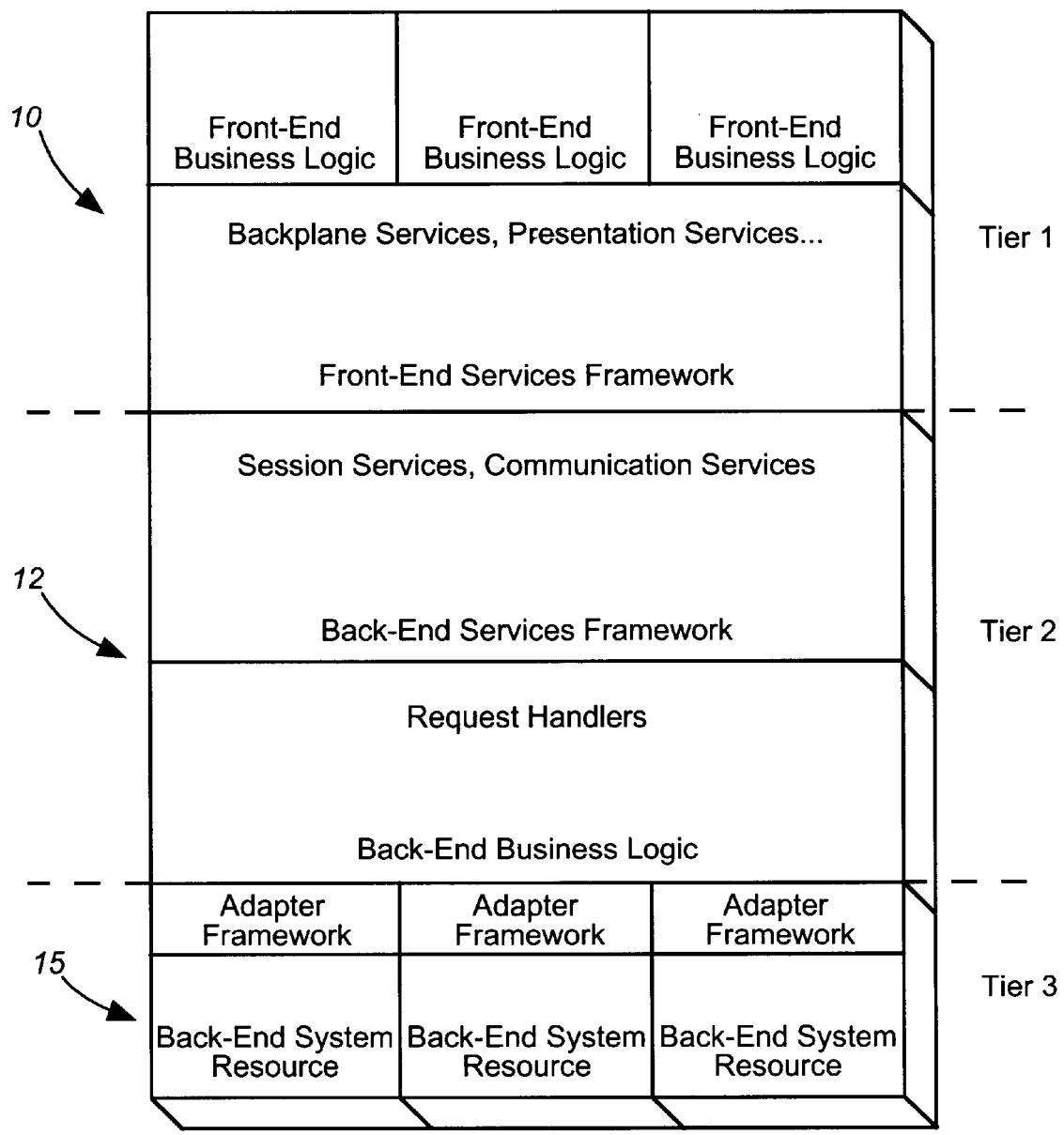
FIG. 1 illustrates the software architecture component comprising a three-tiered structure.

FIG. 1 is a diagrammatic illustration of the software architecture component in which the present invention functions. A first or client tier 10 of software services are resident on a customer work station 10 and provides customer access to the enterprise system, having one or more downloadable application objects directed to front end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additionally applications are directed to front end services such as the presentation of data in the form of tables and charts, and data processing functions such as sorting and summarizing in a manner such that multiple programs are combined in a unified application suite.

A second or middle tier 12, is provided having secure web servers and back end services to provide applications that establish user sessions, govern user authentication and their entitlements, and communicate with adaptor programs to simplify the interchange of data across the network.

A third or back end tier 15 having applications directed to legacy back end services including database storage and retrieval systems and one or more database servers for accessing system resources from one or more legacy hosts.

Generally, as explained in co-pending U.S. patent application Ser. No. 09/159,515, now U.S. Pat. No. 6,115,040, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or Call Manager functions. The system is capable of delivering to customers the functionality appropriate to their product mix.

Figure 2:
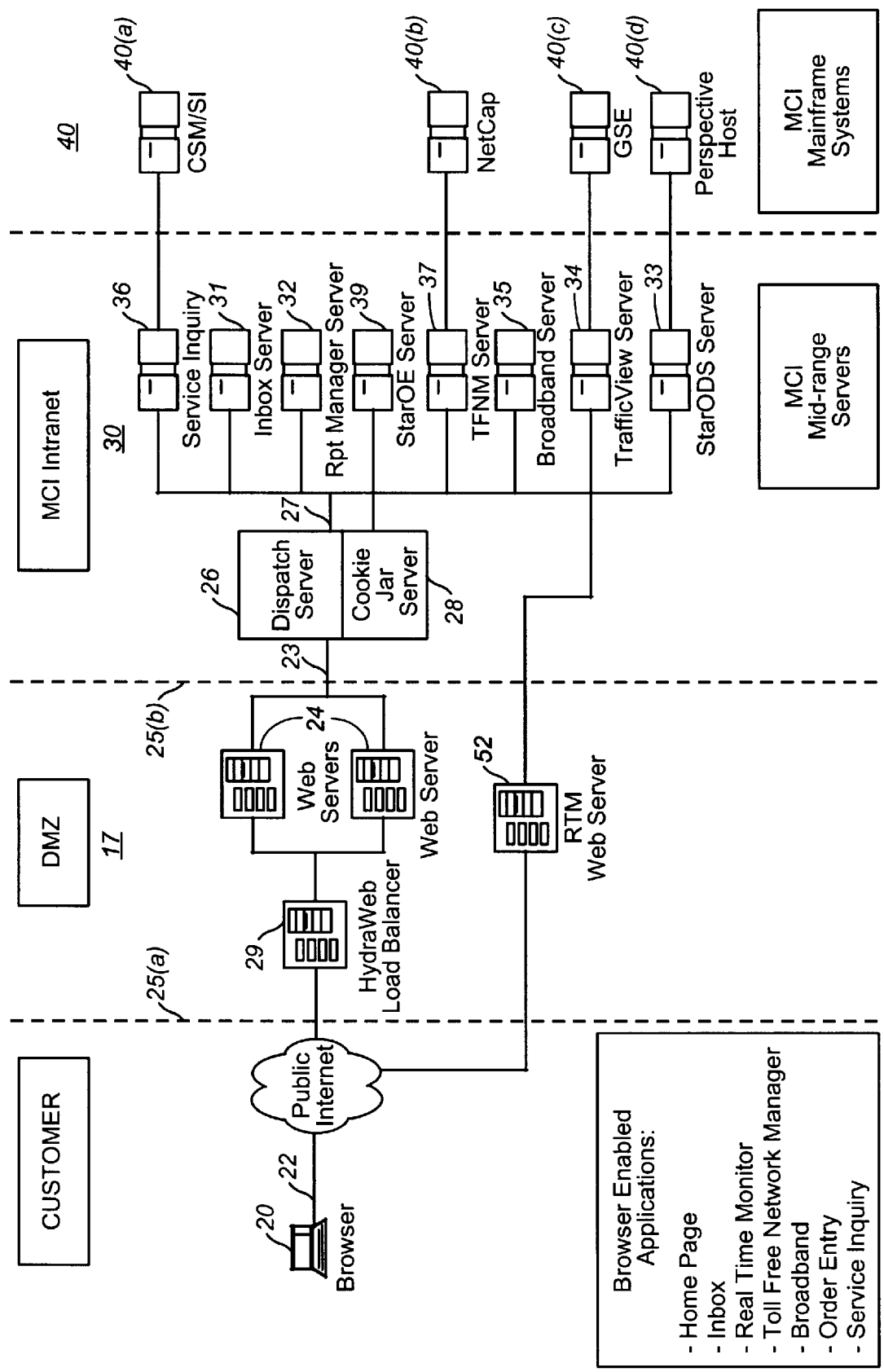
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
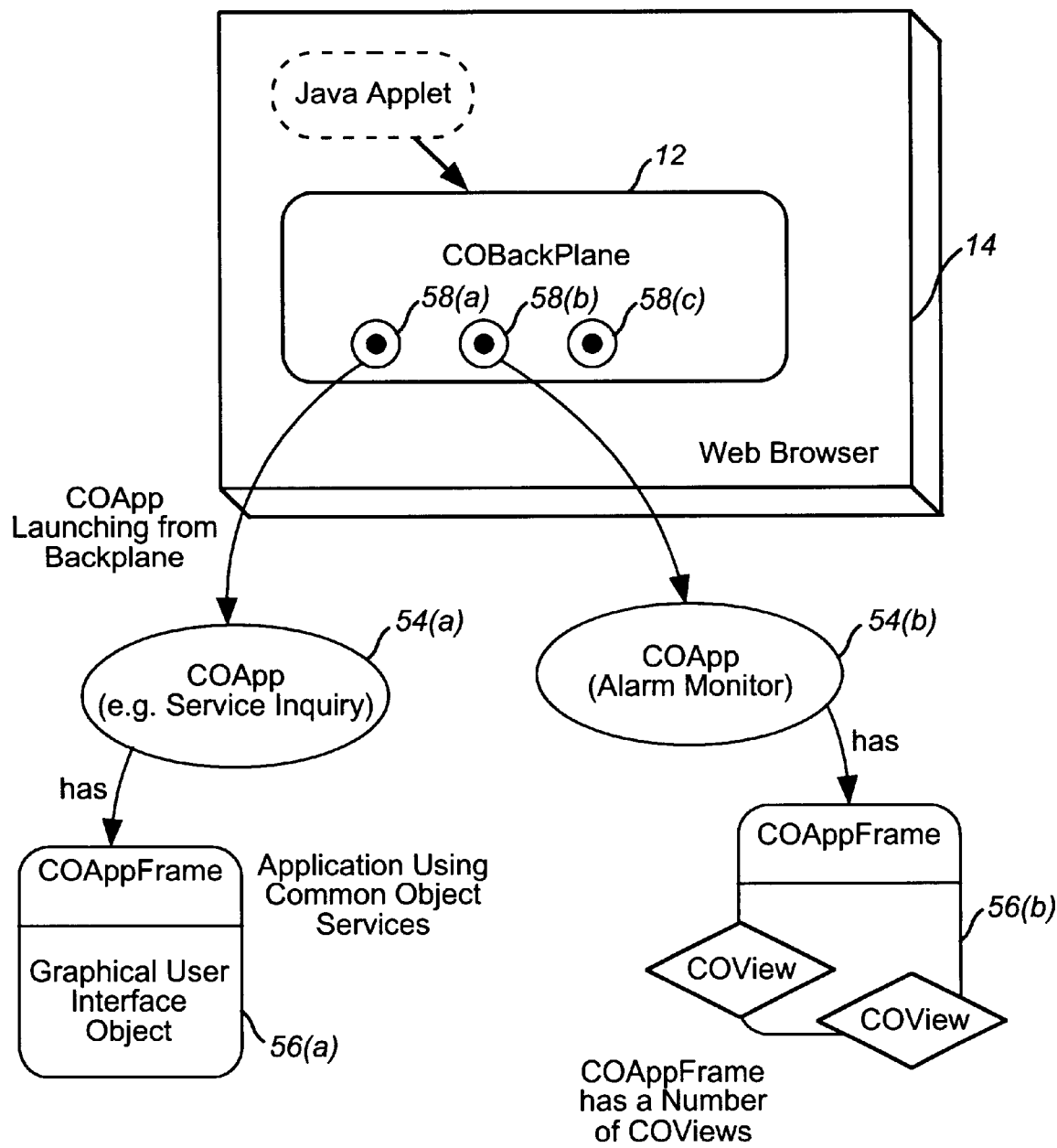
FIG. 3 is an illustrative example of a backplane architecture schematic.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, co-pending U.S. patent application Ser. No. 09/159,515, now U.S. Pat. No. 6,115,040 entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects which provide the front end business logic and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which can be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
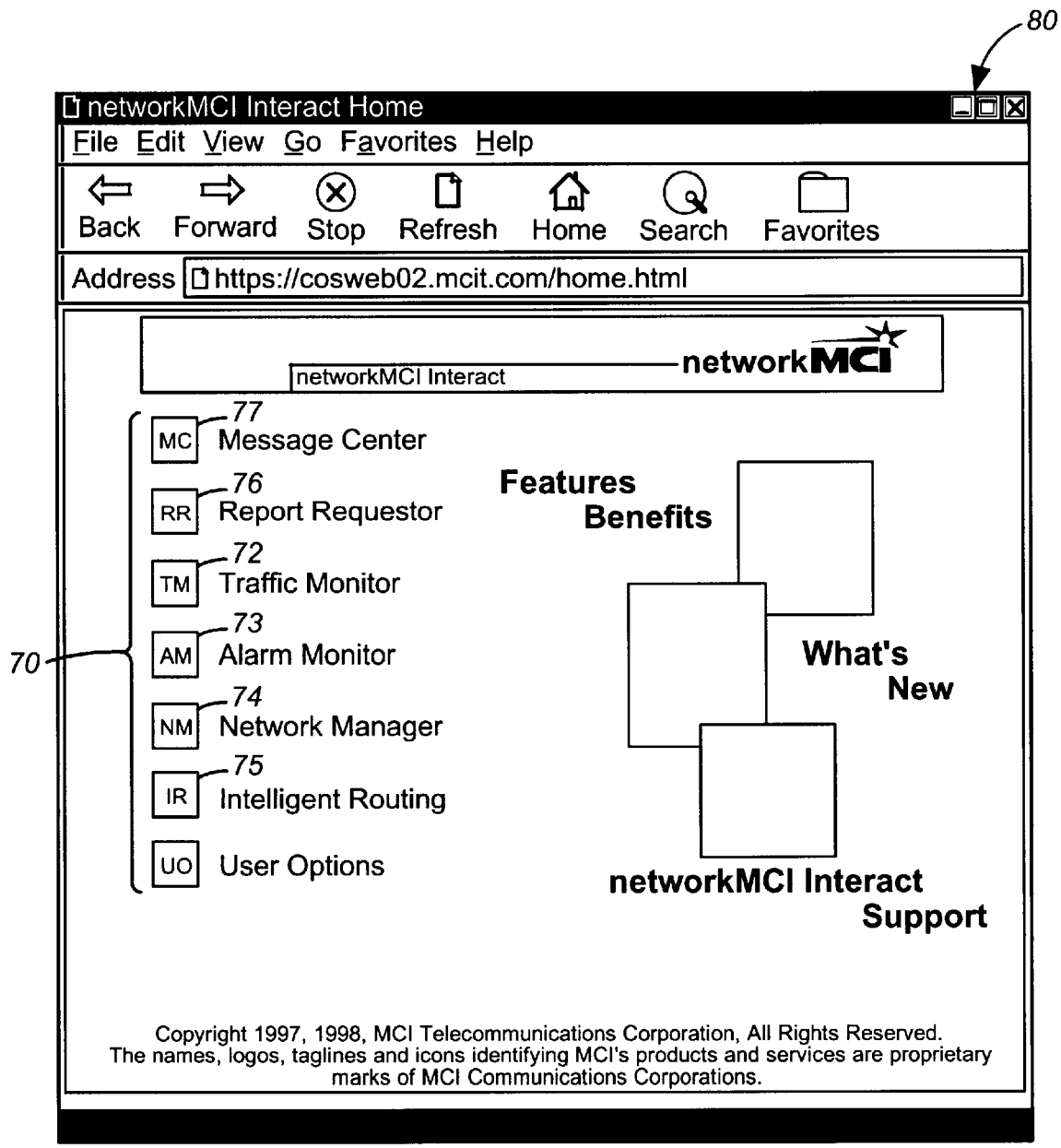
FIG. 4 illustrates an example client GUI presented to the client/customer as a browser web page.

FIG. 4 illustrates an example client GUI presented to the client/customer as a browser web page 80 providing, for example, a suite 70 of network management reporting applications including: MCI Traffic Monitor 72; an alarm monitor 73; a Network Manager 74 and Intelligent Routing 75. Access to network functionality is also provided through Report Requester 76, which provides a variety of detailed priced and unpriced call detail data reports for the client/customer and a Message Center 77 for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init ( ), start ( ), stop ( ) and run ( ). In the init ( ) method, the backplane applet obtains a COUser user context object. The COUser object holds information such as user profile applications and their entitlements. The user's configuration and application entitlements provided in the COUser context are used to construct the application toolbar and Inbox applications. When an application toolbar icon is clicked, a particular COApp is launched by launchAppo method. The launched application then may use the backplane for inter-application communications, including retrieving Inbox data.

The COBackPlane 12 includes methods for providing a reference to a particular COApp, for interoperation. For example, the COBackPlane class provides a getApp ( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application Ser. No. 09/159,515, now U.S. Pat. No. 6,115,040, entitled GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request using symmetric encryption and forward it over a second socket connection 23 to the dispatch server 26 inside the enterprise Intranet.

As described in greater detail in U.S. patent application Ser. No. 09/159,514 entitled SECURE CUSTOMER INTERFACE FOR WEB-BASED DATA MANAGEMENT, the contents and disclosure of which is incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and will reencrypt the message with symmetric encryption and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from a system administration ("StarOE") server 49 at logon time and cached.

If the requester is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages, a Report Manager Proxy capable of communicating with a system-specific Report Manager server 32 for generating, managing and scheduling the transmission of customized reports including, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(a). Such network management and customer network data is additionally accessible by authorized MCI management personnel. As shown in FIG. 2, other legacy platforms 40(b), 40(c) and 40(d) may also communicate individually with the Intranet servers for servicing specific transactions initiated at the client browser. The illustrated legacy platforms 40(a)–(d) are illustrative only and it is understood other legacy platforms may be integrated into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to. the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
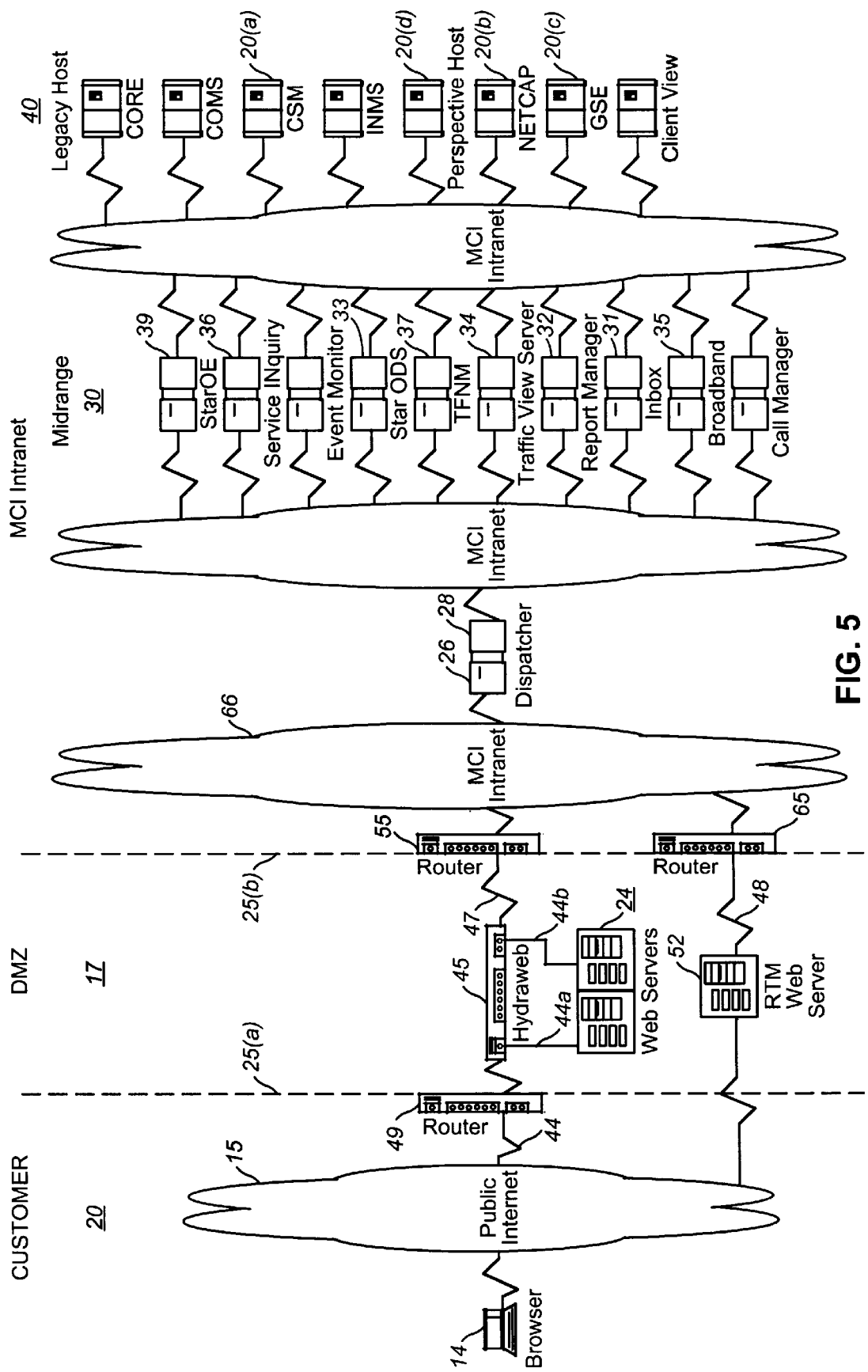
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between both the public Internet 25 and the MCI Intranet to prevent potentially hostile customer attacks; and, 3) the MCI Intranet Midrange Servers 30 and Legacy Mainframe Systems 40 which comprise the back end business logic applications.

As illustrated in FIG. 5, the present invention includes a double or complex firewall system that creates a "demilitarized zone" (DMZ) between two firewalls 25a, 25b. In the preferred embodiment, one of the firewalls 29 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 29a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The Hydraweb unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEBN 45 over a connection 44a and generates the appropriate encrypted messages for routing the request to the appropriate MCI Intranet midrange web server over connection 44b, router 55 and connection 23. Via the Hydraweb unit 45, a TCP/IP connection 38 links the Secure Web server 24 with the MCI Intranet Dispatcher server 26.

Further as shown in the DMZ 17 is a second real time monitor ("RTM") server 52 having its own connection to the public Internet via a TCP/IP connection 48. As described herein, this RTM server provides real-time session management for subscribers of the networkMCI Interact Real Time Monitoring system. At least one additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWeb 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in U.S. patent application Ser. No. 09/159,695, the data architecture component of the networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

The Infrastructure component of the nMCI Reporting system includes means for providing secure communications regardless of the data content being communicated. As described in detail in above-referenced, U.S. patent application Ser. No. 09/159,514, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the StarOE server 49. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in U.S. patent application Ser. No. 09/159,515 now U.S. Pat. No. 6,115,040, the client-tier software is organized into a "component" architecture supporting such applications as inbox fetch and inbox management, report viewer and report requestor, TFNM, Event Monitor, Broadband, Real-Time Monitor, and system administration applications. Further functionality integrated into the software architecture includes applications such as Outbound Network Manager, Call Manager, Service Inquiry and Client View. The functionality of these applications are further enhanced by the adoption of: a CGI program interface to networkMCI Interact that allows HTML and CGI-based systems to access a subset of NMCI Interacts middle-tier services; a Java interface for non-NMCI Interacts Java applets; and, a Common Object Request Broker Architecture ("CORBA") interface to nMCI Interact which allows Web-enabled systems built in C++ and Smalltalk, etc. to use the middle tier services of the network. Implementation of these added systems includes the employment of digital signature/client certificates technology and Java objects.

Particularly, the use of a distributed object technology such as provided by CORBA provides increased functionality.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

A common database may be maintained to hold the common configuration data which can be used by the GUI applications and by the mid-range servers. Such common data will include but not be limited to: customer security profiles, billing hierarchies for each customer, general reference data (states, NPA's, Country codes), and customer specific pick lists: e.g., ANI's, calling cards, etc. An MCI Internet StarOE server will manage the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in an Inbox server database and managed by the Inbox server.

By associating each set of report data which is downloaded via the inbox with a small report description object, it is possible to present most reports without report-specific presentation code (the report-specific code is in the construction of the description object). These description objects are referred to as "metadata," or "data about data." At one level, they function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and subtotaling at an arbitrary number of levels.

In the TrafficView System ("TVS") of the present invention, the customer workstation 10 is equipped with a Web browser for remotely requesting reports of unpriced call detail and statistical data and/or real time access to monitor the state of special service call networks from the traffic view server 34, as shown in FIG. 2. This report request process will be described with respect to FIG. 6 which is a high-level description of the TVS system 100 integrated within the nMCI Interact architecture 200.

Figure 6:
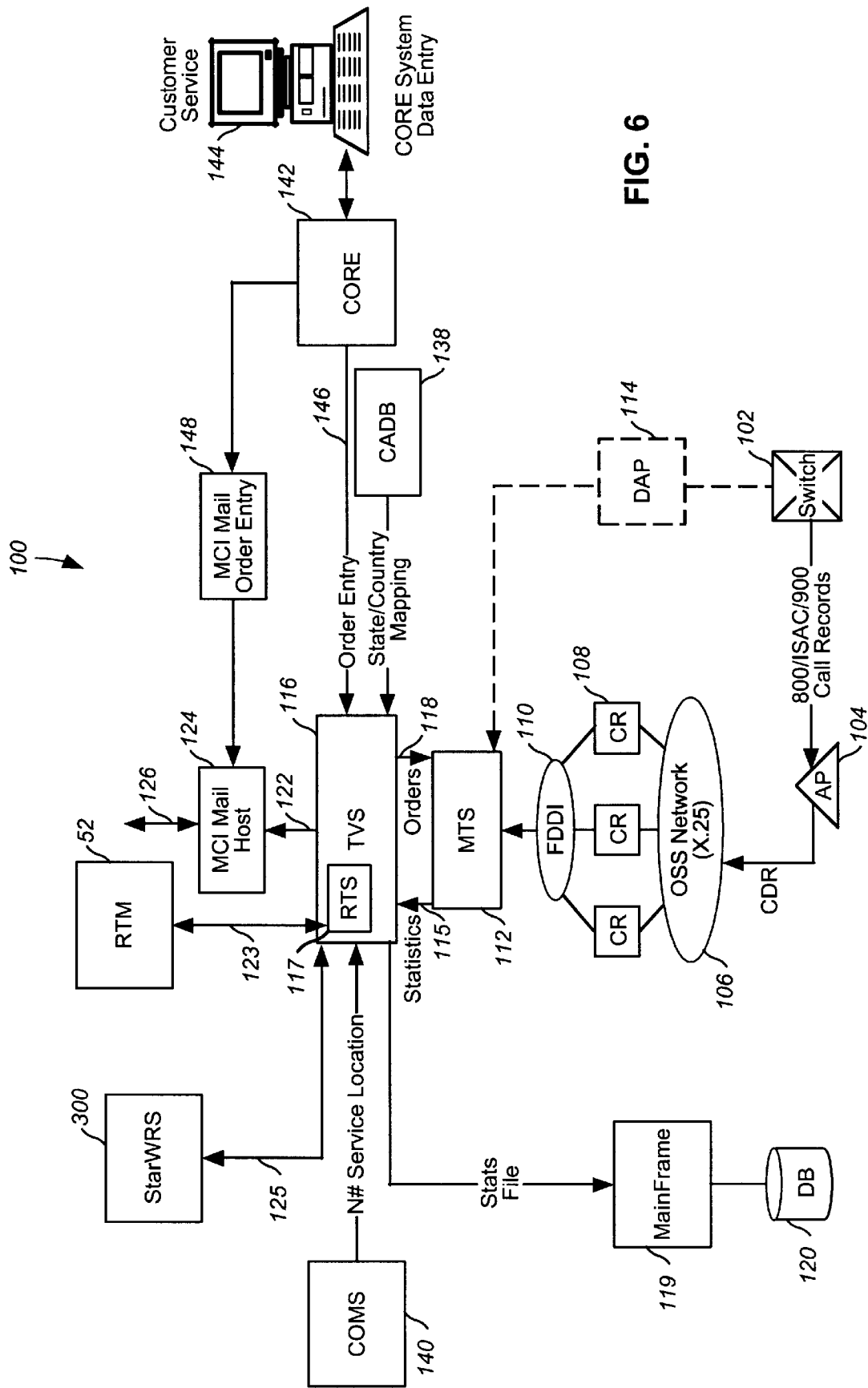
FIG. 6 is an overall view of the "TRAFFICVIEW" system of the instant invention.

With greater particularity, an overall view of the TVS system 100 of the present invention is discussed with reference to FIG. 6. As shown in FIG. 6, the architecture basically starts with a plurality of switching means, such as a number of switches represented by switch 102, in the telecommunications network. Associated with each switch, for example, switch 102, is an Adjunct Processor (AP) 104. One of the main functions of the AP is to perform billing. For each call routed through switch 102, AP 104 generates a Call Detail Record (CDR). The CDR is routed to an Operator Services System (OSS) network 106, which otherwise may be referred to as a X.25 network. Network 106 in turn is connected to a series of processors commonly referred to as Central Retransmitters (CR) 108. The outputs of the respective CRs 108 are provided to a Fiber Distributed Data Interface (FDDI) ring 110. The output of FDDI ring 110 in turn is connected to a MCI Traffic Statistics (MTS) system 112, which is situated in a platform to which another system, namely a DAP Traffic Statistics (DTS), may also reside.

DAP refers to a data access point such as DAP 114 shown in the dotted box of FIG. 6. In particular, DAP 114 is a processor system that provides routing information to switch 102. In addition, DAP 114 also provides information to the MTS (or the combination DTS/MTS system) for the traffic statistics monitoring mentioned in the background of the invention section, supra. A more detailed discussion of a DAP and the DTS is given in the aforenoted issued U.S. Pat. No. 5,537,611 assigned to the same assignee as the present invention, and whose disclosure is incorporated by reference herein. For the instant invention, it suffices to note that the platform to which both DTS and MTS reside is referred to only as the MTS system 112.

MTS system 112 is a system for counting the number of calls through the various switches. For the telecommunications network of the instant invention, calls are understood to be special service calls including but not limited to 800/8xx, 900 and "Vnet." For the discussion of FIG. 6, it is assumed that MTS system 112 counts only 800/900 calls, or traffic.

On a periodic basis, MTS system 112 provides statistics data, also referred to as rolled up statistics, via line 115 to a TrafficView system (TVS) 116. As shown, MTS system 112 also receives orders, via line 118, from TVS system 116. For the embodiment of FIG. 6, rolled up statistics are output from MTS system 112 to TVS system 116 at predetermined time intervals such as every 60 minutes. It should however be understood that the time intervals in which statistics are rolled up from MTS system 112 to TVS system 116 may be varied. Such periodic rolling up of statistics enables the system to provide periodic outputs to subscribers who request only periodic reports. In instances where a subscriber requests the real time option, the statistics are rolled up from MTS system 112 to TVS system 116 in real time so that a subscriber can access TVS system 116 to monitor in real time the operation of the network via the public Internet via second RTM server 52 (FIG. 2).

The process by which rolled up statistics are periodically provided from MTS system 112 to TVS system 116 basically occurs as follows. For a given time period, for example every hour, statistics for customers (subscribers) who have subscribed to the service of the present invention system are accumulated and a customer rolled up peg count message is produced. For the embodiment of FIG. 6, the accumulations are for hourly intervals, with the understanding that future intervals may be set to any time period, for example 20 minute increments. A MTS stats compiler (to be discussed with reference to FIG. 8) writes the customer peg count messages into a "TRAFFICVIEW" server queue. In the case of real time transfer of statistics from MTS system 112 to TVS system 116, the MTS stats compiler writes the customer peg count message directly to TVS system 116, which may be partitioned into two portions, one for receiving the rolled up statistics that are fed periodically while the other for receiving in real time the data from MTS system 112. Real time access is gained through the RTM system 117, as will be described.

For the FIG. 6 embodiment, for example, rolled up statistics corresponding to an 800 number for a given subscriber may include the following data: that 500 call attempts were made to that 800 number of the subscriber, that 400 of those calls were completed, 50 were not completed (incompletes) and 50 of those calls were blocked. Additional rolled up statistics data may include the destination terminations and the originating Numbering Plan Area (NPA) of the calls. These statistics are stored as records in the TVS system 116.

In further view of FIG. 6, the TVS system 116 comprises a number of processors represented for example by a main frame host system 119. Connected to processor system 119 is a storage means, for example a database system 120 which comprises a plurality of memory disks or other storage mechanisms. A more detailed discussion of the hardware components of TVS system 116 and its database system is given, infra. The specific configuration of the database system used with TVS system 116 is given in co-pending application Ser. No. 08/350,186 filed Nov. 30, 1994 now U.S. Pat. No. 5,551,025 entitled "Relational Database System", whose disclosure is incorporated by reference herein.

As further shown in FIG. 6, there are a number of systems communicatively coupled to TVS system 116. In particular, connected to TVS system 116 to receive its outputs, e.g., reports, via line 122, is a first data distribution system, referred to as "MCI MAIL" host 124. Mail host system 124 is a proprietary system of the MCI Communications Corporation (MCI) and is capable of sending out E-Mails, via line 126, to a conventional PC equipped with a modem and appropriate communications software. Mail host 124 may further distribute reports, or data files, from TVS system 116 to a fax machine (not shown) or as a hard copy message, to a printer (not shown).

Further, in accordance with the invention there is provided a TCP/IP connection 125 for connecting the TVS system 116 with nMCI Interact's web/Internet based reporting system, referred to herein as StarWRS system 300, for providing customers with their priced and unpriced telecommunications call detail data reports, as will be described in further detail herein with regard to FIG. 7.

Another TCP/IP connection 123 from the RTM process system 117 of the TVS system 116, to the RTM web server 52 to provide for the real time traffic monitoring capability via the Internet. Thus, the various subscribers to the RTM service, represented by customer workstation 10 equipped with a Web browser, can monitor in real time, or substantially real time, the operation of the network as it relates to the calls directed to that subscriber's special service call number(s). Thus, instead of viewing a past event, using the RTM system 117, a subscriber may retrieve web pages comprising real time data and statistics that present an ongoing picture relating to any, or all, of his special service call numbers. For example, the subscriber can see in real time how many calls are being attempted minute by minute, how many calls are being allowed through the network, how many calls are incompletes, how many calls are blocked, etc. This ability to monitor the operation of the network gives the subscriber the ability to decide in real time the specific actions that need to be taken. For instance, if there is an abnormal number of incompletes for a given period, the subscriber can look at the specific call records that made up those incomplete calls. If needed, the subscriber can request the management of the network to restructure the network so as to reroute the incoming calls of the subscriber to different locations where they may better be handled. The different modules of the RTM system are shown and described herein with reference to FIG. 13.

Also connected to TVS server 116 is a Calling Area Database (CADB) 138 which periodically provides TVS, and, more specifically, database 120 of TVS system 116, mapping data to correlate NPAs to the different states and localities within the states, and country codes to the different countries for further adding call details for the CDRs.

Also shown connected to TVS system 116 is a Circuit Order Management System (COMS) 140 whose function, for the FIG. 1 embodiment, is to provide a file of maps of the service locations, and the ncodes to switches, trunks, or regular telephone numbers.

Further connected to TVS system 116 is a Corporate Order Entry (CORE) system 142 which receives its input from subscribers via a CORE system data entry system such as a workstation or PC 144. In particular, a subscriber can input instructions to CORE system 142 which in turn inputs the instructions as order entries via line 146 to TVS system 116. Some of the data provided by the subscribers to CORE system 142 may include the type of reports the subscribers like to receive, the number of reports the subscribers want, the frequency and how the reports should be sent, and where the reports should be delivered to. With respect to one method in which reports may be delivered, the CORE system 142 sends instructions to a "MCI MAIL" order entry system 148, which in turn forwards the instructions to mail host system 124. Consequently, a subscriber may receive data or reports in a E-Mail format from the TVS system 116. As described in commonly owned, co-pending U.S. patent application Ser. No. 09/159,408 entitled AUTHENTICATION AND ENTITLEMENTS FOR USERS OF WEB BASED DATA MANAGEMENT PROGRAMS, the contents and disclosure of which is incorporated by reference herein, the order entry function may be performed by a StarOE server 26, as will be described in greater detail herein.

Figure 8:
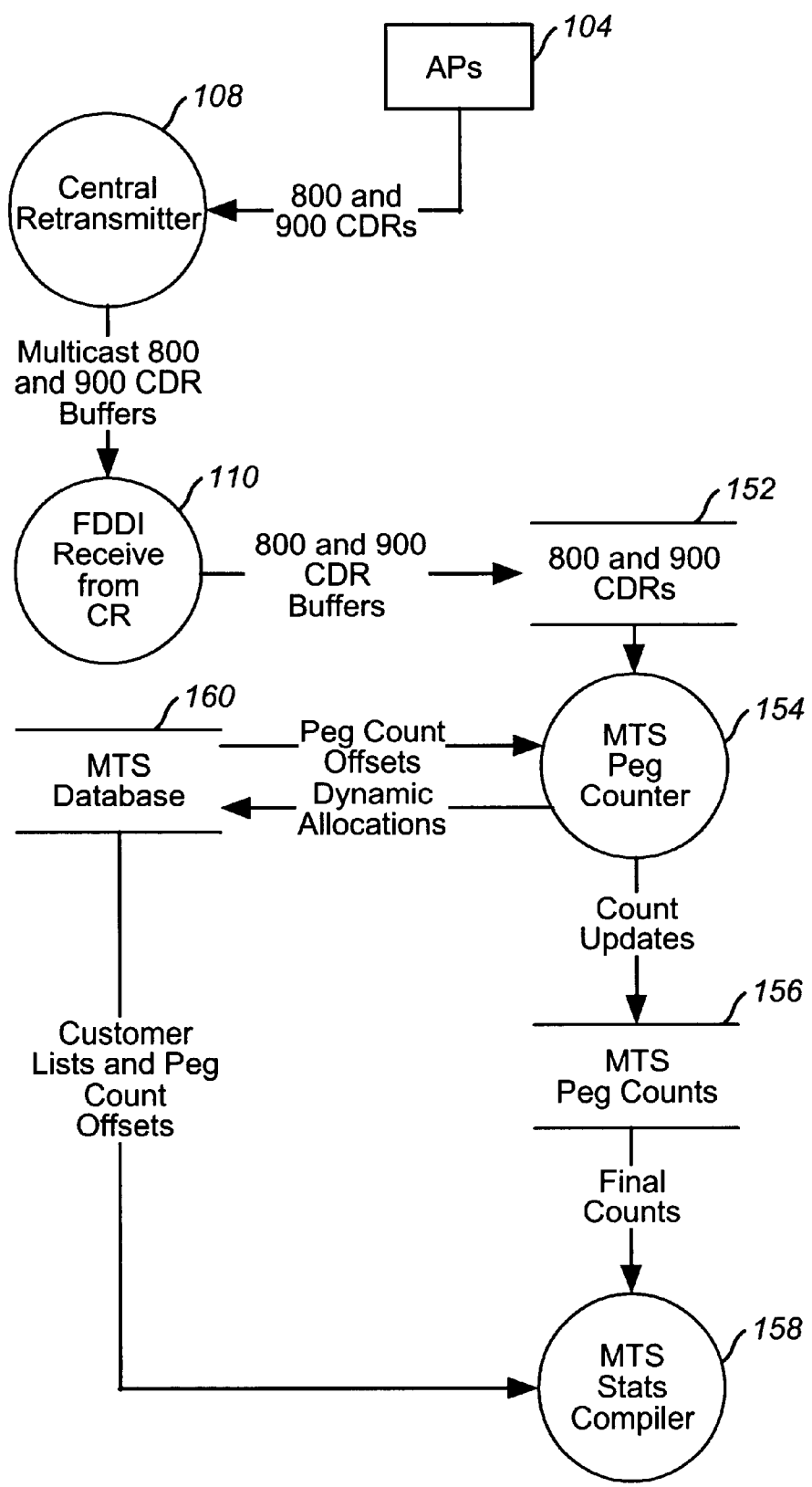
FIG. 8 is a diagram illustrating the functions of the MCI traffic statistics system of the present invention "TRAFFICVIEW" system.

The transmission of data between APs, such as AP 104, and MTS system 112 is described with reference to FIG. 8. As shown in FIG. 8, 800 and 900 CDRs are collected from APs 104 and routed to central retransmitters 108, which are protocol conversion processors. In essence, CRs 108 convert the data from APs 104, which are VAX OSI Transport System (VOTS) messages that are delivered on the X.25 network, into a multi-cast M messages. (OSI is Open System Interconnection).

The MTS system 112 collects CDRs from all APs. The CDRs are collected and buffered at each AP, and sent to MTS system 112 using the OSI class 4 Transport Service (OSI TP4). The CDRs (per buffer) are received at MTS system 112 by a process called the AP OSI communication manager, or AP OSI CM. The AP OSI CM process is responsible for communication between MTS system 112 and the APs. This process runs simultaneously on all of the processors (to be discussed subsequently) of MTS system 112 where each CM receives CDRs from a specific number of APs over OSI transport connections on the OSS NET. This involves establishing and maintaining sessions to receive 800/900 number CDRs from the APs. As each CDR buffer is received from the APs, it is forwarded to the application being run on the processors of MTS system 112. This is done by transferring each buffer (of CDRs) to an Ethernet transmit process, also running on the MTS communication servers. The Ethernet transmit process then uses the Ethernet multi-cast protocol to send the buffer to the application running in MTS system 112.

In terms of the external interfaces, the AP OSI CM process receives CDR messages from the APs by establishing a transport connection via the Packet Net System Interface (PSI), which is used to establish Shared Virtual Circuits (SVCs) over the OSSI NET 106. The CM interfaces to the Ethernet transmit process over a Virtual Memory System (VMS) mailbox where the CM puts the AP CDR message to be multi-casted on the MTS lan. The AP OSI CM maintains a VMS global section where various statuses and performance statistics are kept and updated.

Each AP, as was discussed earlier, is collocated with a switch 102. The AP receives all CDRs generated by switch 102. The records generated by a switch can be in many different categories: for example Call Detail Records (CDRs), Private Network Records (PNRs), Operator Services Records (OSRs), Private Network Operator Services Records (POSRs), and Switch Event Records (SCRs). For the understanding of the instant invention as exemplified by the embodiment of FIG. 6, the only records that are forwarded to MTS system 112 by each AP 104 are the originating switch 800 and 900 CDRs. A filtering algorithm is employed at each AP for filtering the appropriate CDRs.

In sum, Transport Service Data Units (TSDUs) are received by the AP OSI CM. Each of the TSDUs includes CDRs from the AP in a format whereby it includes a AP MTS header which may be for example 16 bytes long. The AP MTS header may include a switch ID identifying the switch where the CDR is from, the CDR count and a filler for filling unused bytes. The AP MTS header is followed by up to 23 CDRs, each of which is 64 bytes long. These multi-cast 800 and 900 CDRs are forwarded by CRs 108 to FDDI ring 110.

The process performed by FDDI 110 is as follows. The FDDI 110 receives the CDRs for MTS 112, and buffers Application Data Field (ADF) message pairs, fraud messages and call detail records from the CRS 108. These CDR messages are put in a queue 152 for the MTS peg counter 154. The CDRs from queue 152 are then forwarded to a MTS peg counter 154 in MTS system 112. The outputs from MTS peg counter 154 are provided to a MTS customer service database 160 and also MTS peg counts buffer 156. The process under which MTS peg counter 154 operates is as follows:

First, the MTS peg counter enhances the call detail record by performing data look-ups on the feature group C, virtual trunk, direct termination overflow and international SAC databases. For the received call records, the MTS peg counter does a database look-up using the pre-translated dialed digits as the key. The look-up will yield the virtual memory address of the necessary peg count storage areas for each 800 number, and a list of counting services to provide for the CDR. There is a linked list header for each possible kind of peg count that an 800 number can have.

MTS peg counts are stored as a virtual memory address of a linked list header. There are two linked list headers per 800 number and peg count type—one for current peg count statistics and the other for the inactive peg count statistics reporting by an MTS statistics compiler 158. Actual peg counts are stored in linked lists, indexed by hour. Call record time points are normalized to Universal Coordinated Time (UCT) based on the switch/AP time. Because of the call record transfer delay between the switch, AP and MTS, MTS needs to store peg counts for multiple hourly intervals for each 800 number. Hourly intervals are sorted in reverse chronological order to expedite peg count storage searches. The peg counter continues to store peg counts for each hourly interval for a configurable interval after the reporting interval. Assuming the initial setting to this configurable interval is 10 minutes, the MTS peg counter continues to store peg counts for each hourly interval unit 10 minutes after the reporting interval is over.

Dynamic allocation is done by the MTS peg counter with a "Doggie Bag" for temporary storage of incoming call records that require a database update before processing. When an 800 number or a termination is not found, the call record is stored in the MTS Doggie Bag. The MTS peg counter requests the database lock, with asynchronous notification through an AST routine. When the lock is granted the AST routine sets a flag indicating the lock is granted. After each buffer of incoming call records have been processed, the MTS peg counter makes the necessary database updates, then processes the record normally, bumping up the appropriate 800 number peg counts.

MTS total call counts provide a summary of total minutes and call completions broken down by the 800 number. These counts can be rolled up to TVS system 116 to provide total minutes and the call completion ratio by customer ID. Total counts include:

Total Completions

Total Call Duration

Total Attempts

Total Switch Controlled Calls (No Action Code Received)

Total NCS Blocked (Action Code 30 Received)

Total NCS Rejected (NCS Failure Action Code Received)

Total Network Blocked (All Routes Busy)

Total Supp Code Blocked

Total Out of Band Blocked

The call completion ratio can be determined for a given 800 number and rolled up under the customer ID to provide call completion statistics, and total call minutes on a customer by customer basis.

$$800 \text{ Call Completion Ratio} = \frac{\text{Completions}}{\text{Attempts} - (\text{Switch Controls} + \text{NCS Blocks} + \text{NCS Failures} + \text{ARBs})}$$

MTS NPA counts are compiled and stored hourly as a block of 160 NPAs. The NPA counts include:

Originating NPA

Total Attempts per NPA

Total Completed Calls per NPA

Total Calls Not Delivered (Blocked) per NPA

Total Attempts for International Originations

Total Completed Calls for International Originations

Total Calls Not Delivered (Blocked) for

International Originations

MTS NPA-NXX counts are compiled and stored hourly as a block of 160 NPAs with their associated NXXs. The NPA-NXX counts include:

Attempts from International Originations

For each Originating NPA . . .
  Attempts for each unknown NXX (for FG-C Originations)

For each NXX of Origination
  Attempts from that NXX

MTS counts for an 800 number are broken down by termination and compiled hourly. Call statistics for terminations include:

Termination Type

Termination Address

Total Completions

Total Call Duration

Call Disposition

Call dispositions indicate the cause of an incomplete call. Terminating call dispositions include:

Total Short Calls. Short calls are calls lasting less than 4 switch ticks with no answer detected. This typically indicates a busy condition. (Each Switch tick is presumed to be 3 seconds).

Total Didn't Wait. Didn't Wait calls are calls lasting from 4 through 8 switch ticks with no answer detected. This typically indicates a call is not answered within 4 ringing cycles.

Total Didn't Answer. Didn't Answer calls are calls lasting beyond 8 switch ticks with no answer detected. This typically indicates a call is not answered within 6 ringing cycles.

Every hour, the MTS peg counter wakes up MTS statistics compiler 158, which then performs sequential traversal of MTS customer service database 160 to generate statistics for every 800 number. The MTS service type (a field in the MTS customer service record) informs the statistics compiler which statistics are being kept for this 800 number (i.e. 800 totals, termination counts, NPA counts, NPA-NXX Counts). A data driven MTS statistics compiler records the services a particular 800 number is registered for; including reporting interval (hourly), statistics destination (MTS server), priority (real time, non-real time), and time offset (usually zero) for statistics delivery.

MTS statistics compiler 158 reads MTS customer service database 160 in priority order, so statistics are processed for all real time 800 numbers first, followed by statistics for the non-real time 800 numbers. The priority feature allows MCI 800 "TRAFFICVIEW" subscribers who are signed up for hourly data to gather their data first, while subscribers who only want daily, weekly or monthly reports from the TV server of TVS system 116 will get their data later. The TVS system may also be referred to as "TARS" (Traffic Analysis Reporting System) server.

For each 800 number found in the MTS customer service database 160, MTS statistics compiler 158 finds the matching peg counts in memory and constructs an "MTS Peg Counts Message for an 800/900 Number." A MTS send out routine is invoked to send each message to TVS system 116.

The "MTS Peg Counts Message for an 800/900 Number" comprises a fixed message part and a variable number of optional parameters. The fixed message part identifies the 800/900 number for which the statistics are being reported, the time interval the statistics are from and other key information. The optional parameters that are reported for a given 800 number depend upon the service identified for the 800 number in MTS database 160. The following table identifies the service types and their corresponding optional parameters:

Service Type
Optional Parameters in B.1 Message

| | |
|---|---|
| 1. Total Service | EF - MTS Totals Counts |
| 2. Termination Service | EF - MTS Totals Counts |
| | EC - MTS Counts by Termination |
| 3. Standard Service | EF - MTS Totals Counts |
| | EE - MTS Counts by NPA |
| | EC - MTS Counts by Termination |
| 4. Demographic Service | EF - MTS Totals Counts |
| | EE - MTS Counts by NPA |
| | ED - MTS Counts by NPA-NXX |
| | EC - MTS Counts by Termination |

MTS statistics compiler 158 does not begin reporting on an hour until a configurable interval (default 5 minutes) after the hour. As each statistics message for a given hour is constructed and sent, MTS statistics compiler 158 frees any memory used to hold peg counts for the current 800/900 number. This memory is returned to a common pool of free memory, available for use by the peg counter as needed.

After sending all of the required statistics messages for a given hour, MTS statistics compiler 158 sends an "MTS Switch/AP Report Status Checkpoint Message" to the server. This message serves two purposes: (1) it informs TVS system 116 that all messages for an interval have been sent; and (2) it shows the TVS system 116 how accurate the 800/900 number data it received is, by showing how far behind each Switch/AP is in sending statistics messages to the MTS.

Ideally, the "Last Call Record Disconnect" time point for each Switch/AP is sent after the end time of the hourly interval. That means that the Switch/AP is keeping up with traffic levels, but does not necessarily mean that the data reported for an 800 number is entirely complete. There is still the possibility that long duration calls have not disconnected, and therefore will not be reported until the next hour.

Also after generating the 800 number statistics messages, MTS statistics compiler 158 generates an "MTS Network Statistics Message." This message is not sent to TVS system 116 but is only written to the test files or the test multi-cast address. The message is useful for network management purposes, for gauging traffic levels throughout the day and for determining the transition mix at intelligent network platforms such as Network Control System (NCS).

After all statistics messages are generated for an hour, MTS statistics compiler 158 hibernates, waiting to be awakened again by the MTS peg counter 154 for the next hour. Note that although "hourly interval" has been described as the basis on which MTS statistics compiler 158 runs, in actuality, the interval is completely configurable to be any reasonable time period. In fact, the interval for MTS statistics compiler 158 may be set to five minute intervals such that statistics messages are generated every five minutes and forwarded to MTS system 112. By shortening the "interval" to such a short time period, the statistics provided to TVS system 116, and therefore to RTM system 117 (FIG. 6) through which a subscriber can log on, becomes substantially in real time. For those subscribers who continue to want only periodic reports or updates, the five minute interval statistics can be summed to achieve the desired duration. For example, if a subscriber only wants hourly updates, statistics for 12 consecutive five minute intervals are summed to provide the hourly updates.

Figure 9:
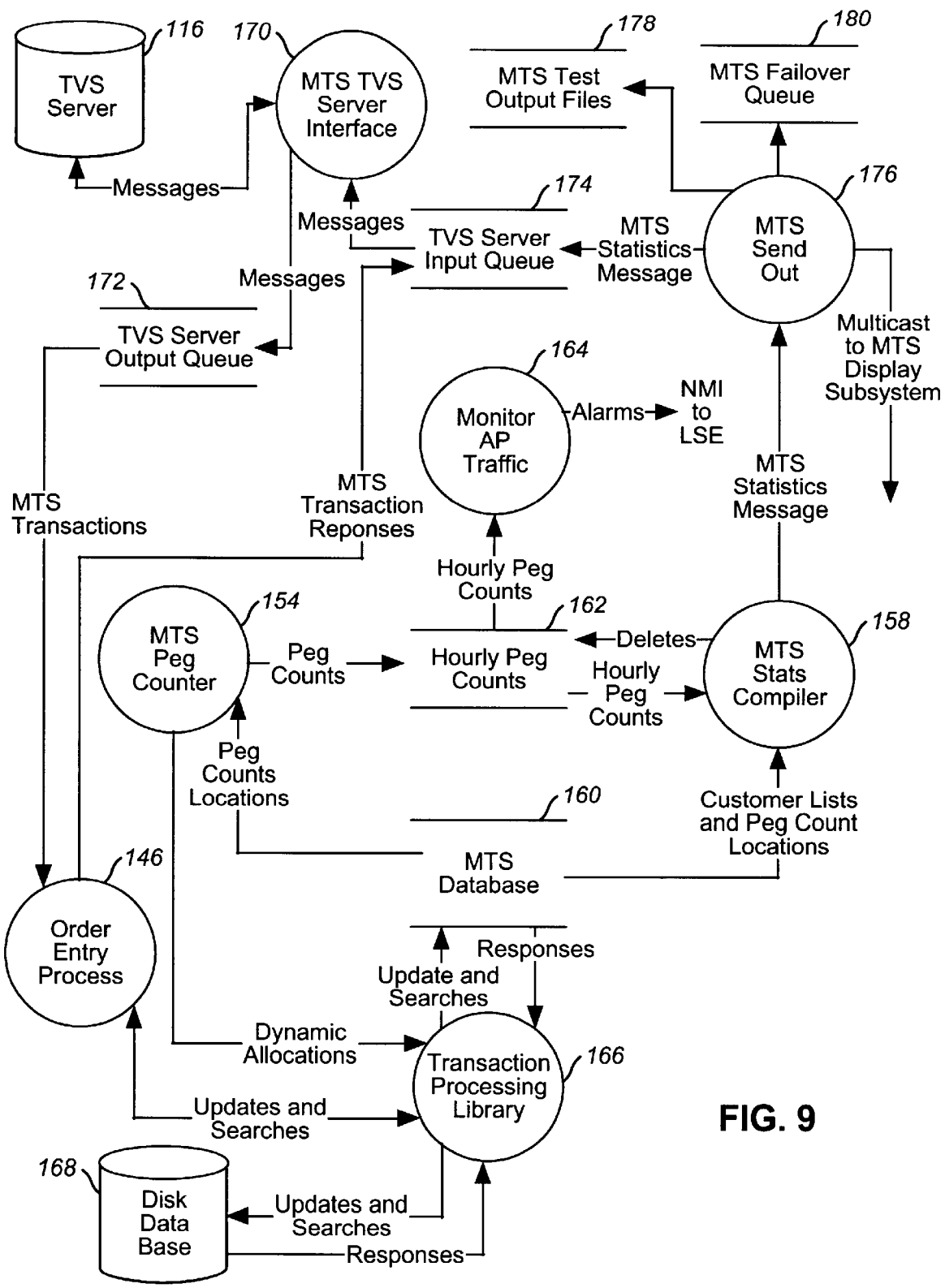
FIG. 9 is a diagram illustrating the different functions of the MCI Traffic Statistics (MTS) system, in receiving data and transmitting that data to the "TRAFFICVIEW" Server (TVS) of the "TRAFFICVIEW" system of the present invention.

FIG. 9 provides a more comprehensive view of the different operations of MTS system 112, and the relation of those operations to the exchange of information between MTS system 112 and TVS system 116.

In particular, as shown in FIG. 9, the hourly peg counts, stored in buffer 162 from MTS statistics compiler 158, are monitored in Monitor AP Traffic process 164. Process 164 is responsible for sending alarms to the Network Management Interface (NMI) and the Local Support Element (LSE) whenever an AP fails to send messages to MTS system 112 within a pre-configured time period. For the embodiment of this invention, the time period is assumed to have a default setting of 5 minutes. This process continues to send alarms every 5 minutes as long as no messages are received from an AP. Also with respect to the instant embodiment, the first two alarm messages are assumed to be sent as warnings. Further assume the third alarm message is sent to indicate that there is in fact an error.

Data is exchanged from MTS database 160 to a Transaction Processing Library (TPL) 166. The TPL 166 is a centralized, table driven set of software routines that are callable by any process for modifying or searching through its associated memory or disk database 168. TPL 166 is called through a TPL interface by the MTS administration processes. The MTS Statistics compiler 158 and peg counter 154 call hash routines directly to perform database searches. All other functions performed by those processes and all of the other processes access TPL 166 directly through a TPL controller. The TPL 166 also allows a transaction to back out from the database when any part of the transaction fails.

With respect to MTS system 112, TPL 166 maintains these databases:

Customer Definition,
Monitored Customer,
Termination by 800/900 number,
Termination counts by originating NPA,
MTS Customer Service,
MTS 800 Service Types,
MTS Network Service Types,
MTS Destinations,
MTS Network Service.

TLP 166 maintains these lists:
Real time customer list; and
Non-real time customer list.

TPL 166 maintains these arrays:
Switch/ARU Array
DAP Transaction Server Array
NPA/Location descriptions TPL 166 maintains MTS control block. For MTS system 112, among other functions, TPL 166 supports the following:

Add an 800/900 number
Delete an 800/900 number

Search the Customer Definition file for a record
Add a termination to an 800/900 number
Delete a termination for an 800/900 number
Search the "Termination of an 800/900 number" file for a record
Update a "Termination of an 800/900 number" record
Add a switch/ARU
Delete a switch/ARU
Add a transaction server
Delete a transaction server
Initialize TPL
Search the Termination by 800/900 number file (TRMN00)
Update an NPA
Update a switch
Search for a switch
Update the MTS control block settings
Update an MTS monitored 800/900 number
Search for an MTS monitored 800/900 number
Add an MTS feature group C record
Delete an MTS feature group C record
Search for an MTS feature group C record In addition to corresponding with MTS database 160 and its associated disk database 168, TPL 166 also corresponds with an order entry process, such as that represented by line 146 (FIG. 6) performed by CORE system 142. Specifically, order entry process 146 is responsible for taking MTS transactions received from the TVS system 116, and applying the appropriate updates to MTS database 120. As shown in FIG. 9, the TVS transactions are received from the TVS server process 170 via a TVS server output queue 172. The order entry process 146 then invokes an application from TPL 166 to execute the transaction. A response is received from TPL 166 and a MTS transaction response message is constructed and sent back to TVS server interface 170 via a TVS server input queue 174.

The MTS/TVS server interface process 170 is responsible for detecting link outages between the MTS system 112 and the MTS server. Upon link failure, MTS server interface 170 archives MTS statistics messages in a safe stored queue. The archive messages are sent in a First In First Out (FIFO) order when the link resumes normal operation.

If failover occurs during statistics compilation on a primary MTS node, MTS/TVS server interface process 170 begins to read messages from MTS statistics compiler 158 and send the messages to MTS system 112. If failover occurs when statistics compilation is complete, there should be little or no data in the MTS/TVS server queue for MTS server interface process 170 to read.

The MTS/TVS server interface 170 also is responsible for receiving MTS transaction messages from the server in MTS system 112. Incoming MTS transaction messages are placed in TVS server output queue 172 for the order entry process 146 to read and process.

Further with respect to FIG. 9, note that the TVS server input queue 174 has provided as one of its inputs MTS statistics messages from a MTS send out process 176. The MTS send out process 176 is a central routine that sends out all MTS output messages. MTS send out process 176 is able to send messages to the TVS server, multi-cast to a MTS display subsystem (not shown) and to MTS test output files 178. Moreover, as was mentioned previously, any failover messages are sent via MTS send out process 176 to a MTS failover queue 180.

The different types of MTS statistics are listed hereinbelow.

MTS incoming statistics:
   The number of call detail records received broken down by, message type, messages with invalid transaction IDs, and counts of the message buffers that are dropped. (Each buffer has a sequence number. When a buffer is received out of sequence this count is incremented)
   Total current MTS TPS,
   MTS Monitored 800/900 numbers TPS,
   Peak MTS TPS since monitoring was initiated,
   A real time bar graph showing the current MTS TPS, and
   A count of the number of TVS server transactions received, a count of how many of them caused failure responses, and a count of how many of them caused success responses.

MTS system statistics:
   Total current MTS TPS;
   MTS monitored number TPS;
   Output messages sent to TVS server;
   Output messages sent to NMI;
   Number of MTS monitored numbers broken down by service subscription:
      800 totals counts
      800 termination counts
      800 NPA counts
      800 NPA/NXX counts
   How much memory has been allocated, used, and is available for each of the databases, files and peg count areas.

MTS outgoing statistics:
   Output configuration:
      800 number and termination dynamic allocation flag
      Termination dynamic allocation only flag
      Send output to TVS server
      Send output to MDS
      Send output to test output file
      Send output to remaining 5 alternate destinations
   Output to the TVS server broken down by message type,
   Dynamic allocation alarms broken down by database type.

MTS current peg counts:
   Monitored 800/900 numbers
   Termination for a specific 800/900 number
   NXX counts for a specific 800/900 number
   AP Statistics counts
   Network statistics counts With reference to FIG. 10, the operation of TVS system 116, as represented by its TVS server, is discussed. As shown, TVS server 116 interfaces with a number of systems, among which include MTS system 112. The interfacing between MTS system 112 and TVS server 116 is of import, and a discussion thereof is given hereinafter.

In particular, the MTS and TVS systems, more specifically their respective servers, exchange information via a pair of communications managers (CM). These are the MTS send CM and TVS receive CM. The processes performed by the two communications managers implement a client/server arrangement between the MTS and the TVS systems. Together, the two communications managers (processes) provide a bidirectional data transfer path between the MTS and TVS systems. Each CM has an input and output queue. A message written to the input queue of one CM is transmitted to the other CM and placed in that CM's output queue.

The MTS send CM accesses the client in the client/server arrangement, as it is responsible for establishing a transport connection between the two processes. The TVS receive CM acts as the server, as it accepts transport connections from one or more MTS send CM clients.

The communication mechanism between the MTS and TVS systems is via an OSI class 4 (or OSI TP4), an error detection and recovery transport server that provides reliable full-duplex, connection oriented data transfer between OSI-compliant systems. For the connection, VLTS is used.

There are two data flows between the two systems, namely a call completion statistics and call detail data flow from the MTS to TVS system, and administrative control messages flow from the TVS to MTS system. The call completion statistics messages and call detail messages make up the great bulk of the traffic. Since there is a large volume of call statistics and call detail to be quickly transferred and the destination queue on the TVS system is of finite size, a sliding window protocol is used on top of the transport layer to allow rapid data transfer and to avoid overfilling the output queue of the TVS server. The administrative control message volume and timing requirements are such that a windowing mechanism is not employed from the TVS CM to the MTS CM.

Thus, the MTS send CM functions as follows:

1. A transport connection is established to the TVS receive CM.
2. An asynchronous read is posted on the transport connection.
3. A series of asynchronous reads, determined by the window size, is posted on the input queue.
4. When a message is placed in the input queue, it is removed from the queue and written to the transport connection.
5. When an acknowledgment message is received from the TVS receive CM over the transport connection, another read is posted to the input queue and the read is reposted to the transport connection.
6. When an order entry message is received from the TVS receive CM, it is placed in the output queue and another read is posted on the transport connection.

The TVS receive CM functions as follows:

1. The receive CM accepts a transport connection from the send CM, and posts an asynchronous read to the connection.
2. An asynchronous read is posted to the input queue.
3. Messages are read from the transport connection, placed in the output queue, and an acknowledgement message is written back to the transport connection.
4. Messages are read from the input queue and written to the transport connection.

Both CMs keep link status information and transaction peg counts in a global section. A monitor program is supplied with each CM to map to this global section and display the status and transaction information.

Figure 10:
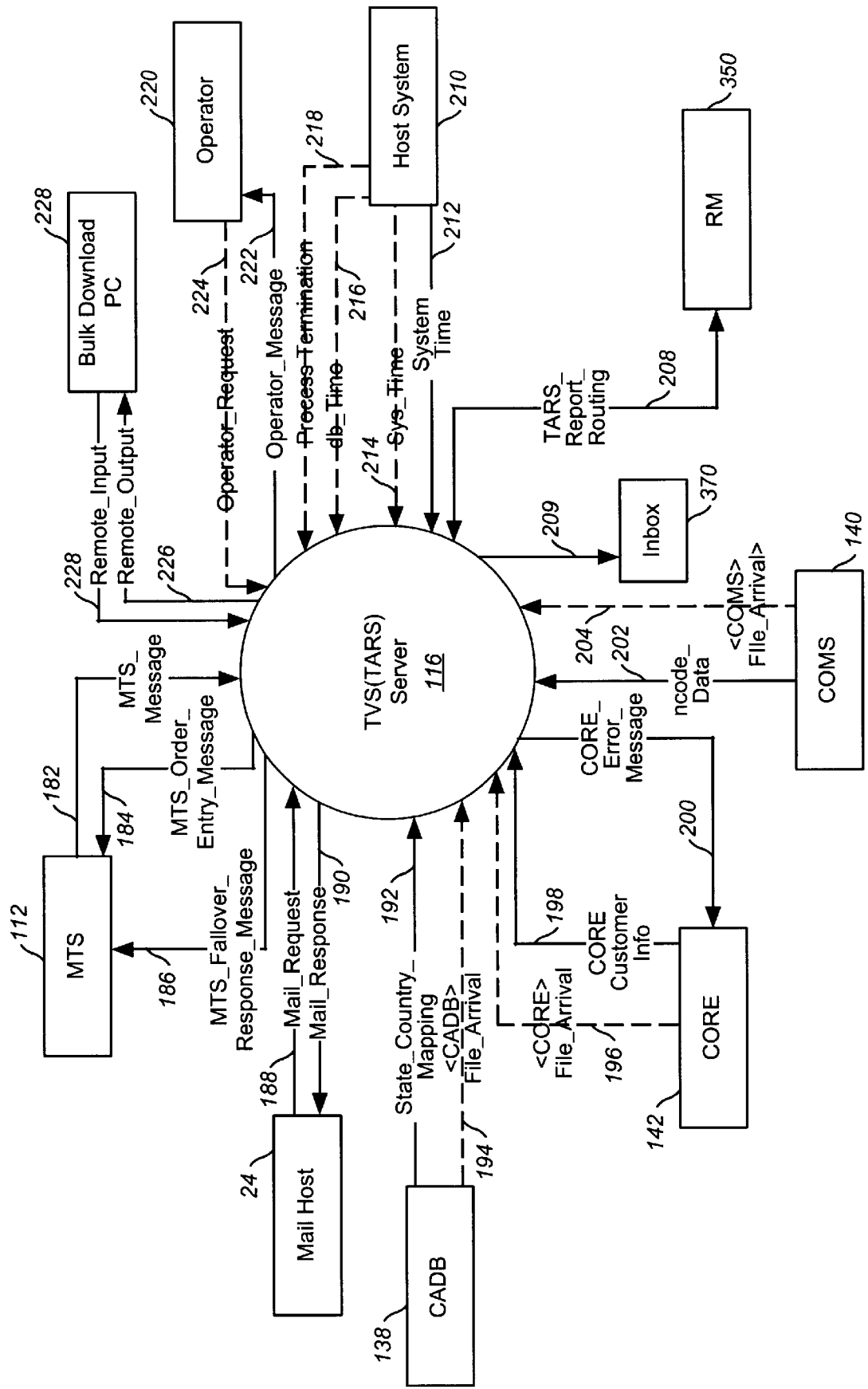
FIG. 10 is a diagram illustrating the functional relationships between the TVS system and the various systems connected thereto in the "TRAFFICVIEW" system of the present invention.

As shown in FIG. 10, the server of MTS system 112 sends a plurality of MTS messages to the server of TVS system 116 via the MTS Message line 182. Specifically, for the instant embodiment, the MTS server provides 800/900 call dispositions and call detail statistics to the TVS server. The following are the type of call dispositions sent: total short calls (including busy calls), total did not wait calls, and total did not answer calls. The following call detail statistics are extracted from the switch call record information elements: total completions (answered calls), total call duration (call minutes), total attempts, totals by terminating address, totals by NPA, totals by NPA-NXX, total switch controlled blocks, total network block calls.

The following noninclusive information for Enhanced Call Detail Records (ECDR) are also sent from the MTS system 112 to TVS system 116 in a steady stream: dialed number, calling number, output digits, originating switch, originating trunk, call origination time (TP1), connect time (TP3), answer time (TP6), disconnect time (DP7), call duration, ring duration, originating MPA, disposition, intended termination type/address, actual termination type/address, corporate ID, origination country code, originating port ID. In addition to providing call details to TVS system 116, MTS system 112 also sends messages to TVS system 116 via line 182. Some of these messages may include a message that the system is falling over from one node to another. It could also be a response message to an order entry message that was sent to the TVS system 116 by CORE system 142. It could further be a check point message sent at the end of every hour after the MTS server has sent all of the statistics, and that those statistics are indeed all of the statistics to be received from the past hour.

A second link connecting MTS system 112 and TVS system 116 is a MTS order entry message line, designated 184. This is when the TVS system has received an order from CORE system 142, and the TVS server has to send a message to the MTS server to instruct MTS system 112 to gather the data required, for example, for a specific 800 number. In other words, the message from the TVS server requests the MTS server to capture data for the specific 800 number at a specific level, of which there are four for the instant invention.

The first level is a capture statistics only level which provides information on call attempts. It is a summary information level that indicates, for example, that there are these many calls, these many calls were completed, these many calls were incomplete calls, and these many calls were blocked. The second level provides all of the information provided in the first level, and information relating to the terminations where the completed calls went. The third level is a combination of the first and second levels and the addition of the originating NPA. The fourth level includes the information of all of the first to third levels plus the NXX (exchange code) for origination.

A third link 186 that connects the MTS server to the TVS server is the MTS fallover response message line. This is the connection used by the MTS system 112 to inform TVS system 116 that there has been a fallover from a first processor of MTS system 112 to its backup processor. In essence, MTS system 112 in actuality comprises two processors that are mirror images of each other. Thus, if one of the processors breaks down, the other processor takes over. Link 186 provides an indication from the MTS system 112 to the TVS system 116 that the backup system has taken over.

Also communicating with the TVS server is the mail host 124. As was discussed previously, mail host 124 in essence is a system through which the reports from TVS system 16 may be sent to the different subscribers, e.g., via E-Mail, fax or as hard copies. A request for mail is sent by mail host 124 to the TVS server via line 188.

The Circuit Availability Database (CADB) 138 is additionally connected to the TVS server by means of line 192. In essence, CADB 138 provides the TV server a file on a periodic basis that includes information which allows the TV server to map the NPAs to states, NPNX to cities and other localities within the states. The file also provides mapping information to the TVS server to map country codes to country names, for example 144 being representative of the United Kingdom. It is this information from CADB 138 that the TVS server uses for outputing reports that provides answers to the subscriber on where calls to his special service call number come from.

Also shown connecting CADB 138 to the TVS server is a dotted line 194 which in FIG. 10 represents a trigger to indicate that something has happened. For example, line 194 indicates that the file from CADB 138 has arrived at the TVS server and that the TVS server needs to process it.

The CORE system 142 is connected to the TVS server of TVS system 116 via lines 196, 198 and 200. Line 198 represents a customer information line through which files containing orders for reports, or orders to turn off reports as the case may be, are provided from CORE system 142 to the TVS server. Line 196 is a trigger that shows that a CORE file has arrived and that the TVS server should begin to process it. Line 200, on the other hand, is a CORE error message line from the TVS server to CORE system 142. This line is used by the TVS server to transmit to CORE system 142 an indication that a record of a file being processed by the TVS server has been rejected. For example, the TVS server may reject a record because it has an incorrect address or does not have any phone number with it.

In sum, the interaction between TVS system 116 and CORE system 142 is as follows. A file is sent from CORE system 142 to TVS system 116. A trigger is then sent by CORE system 142 to the TVS server to inform the latter that the file has arrived. The TVS server then processes the file, looks for any error, and if an error is found, sends a message back to CORE system 142 to inform it of the error. At approximately the same time, the order entry information is sent by the TVS server to MTS system 112 via line 184.

The TVS server also interacts with Circuit Order Management System (COMS) 140. It does so via lines 202 and 204. COMS system 140, in essence, provides an ncode or service location data to the TVS server via line 202. An ncode is an eight digit character, the first character of which being always N and the remaining seven characters being always numbers. It is also referred to as a service location by which a subscriber can determine the termination point of a call. For example, when a subscriber sees a bill for an 800 number, he usually does not see the termination point from which the call originates. Rather, he will see that his 800 number (for example N 555-1111) had received so many call attempts. The termination report provided to a subscriber allows the subscriber to compare the report with his invoice for any discrepancies. For example, if the telecommunications network company has billed the subscriber for 500 calls while the report indicates that only 495 calls were made, the subscriber can then find out from the company why there is a discrepancy of 5 calls. Line 204 is a trigger that informs the TVS server that the file from COMS system 140 has arrived.

The TVS server is also connected to a Report Manager server (RM) 350 which is a component of the "nMCI Interact" StarWRS reporting system 300. It is broken out in FIG. 10 to show that reports actually go to an interface from the TVS server, via line 208. To elaborate, the TVS creates the report and knows which subscriber is supposed to get the report. As will be described herein, a metadata request message is sent to RM 350 requesting a desired unpriced traffic call detail data report. The RM server processes the metadata request and forwards the message to the TARS 116 via TCP/IP connection 208 which generates the requested report for subsequent transport via TCP/IP connection 209 to an Inbox server, i.e., StarWRS message center 370. As will be described, the Inbox server 370 supports report retrieval via the subscriber's web browser.

The next system that communicates with the TVS server is a host system 210, which is the TVS system itself. Host system 210 in essence is the operating system where certain information required for operation of the TVS server is provided. For FIG. 10, it is assumed that the TVS server is in fact an application being performed by host system 210. Host system 210 provides a number of triggers to the TVS server for further processing. For example, via line 212, host system 210 provides a system time to the TVS server so that the TVS server can generate a time stamped report. Via line 214, host system 210 provides the TVS server a trigger of a particular time when the TVS server needs to perform some function. For instance, the system time from line 214 may trigger the TVS server to automatically generate a number of reports, some of which may be generated hourly, daily, or weekly. This is a background process that schedules the generating of reports on a periodic basis.

Line 214 is a system time line trigger by which host system 210 informs the TVS server that it is time to provide a nightly maintenance of the database itself, such as database 220 in FIG. 6.

The process termination trigger from line 218 by host system 210 informs the TVS server that one of its processors has terminated operation. As was mentioned previously, TVS system 116 comprises a number of processors each mirroring the operation of the others. The system knows which processors should be running at any given time. Thus, should one of the processors terminate its operation, notification is received by the host system that operation at that processor has been terminated so that the host system can instruct the operating system to transfer the process to one of the other backup processors, or to restart the process. Host system 210 is thus an automatic failure recovery system, the process termination trigger informing the system that the process has terminated, at which time the operator of the system needs to determine what type of system error has occurred.

A system operator, designated 220, actually watches over the TVS system to make sure that it is operational. Typical error messages are provided to the operator from the TVS server via line 222. A trigger is provided by the operator to cause the system to perform some function, for example a backup process, if an error is noted, via line 224. The trigger provided to the TVS server may in fact be from the keyboard of the operator. The TVS server may also communicate with other computer workstations or PCs, represented simply as 228 in FIG. 10. Some of the PCs 228 in actuality connect to the TVS server via a mail host 124. Those PCs that gather and retrieve perspective data such as rolled up statistics or CDR flat files, may be connected directly to the TVS server. This is indicated by the remote output line 226. Line 228, on the other hand, enables the TVS server to communicate directly with the remote PCs. Through line 228, the TVS server can validate PC 228 so as to communicate therewith. Data can then be downloaded from a PC 228 to the TVS server.

The six major functions performed by the TVS server are discussed with reference to FIG. 11. Mapping feeds process 230 processes feeds from CADB system 138 and COMS system 140. As shown, a country mapping feed, designated 232, is provided by CADB system 138 to map the different country codes. A second input provided to mapping feeds process 230 is the ncode data, via line 202 from COMS system 140. Switch mapping data is also provided by COMS system 140 as an input via line 234. There are two triggers provided to mapping feeds process 230. One of the triggers is from COMS system 140 to indicate that the file from COMS system 140 has arrived. This is indicated by line 204. The other trigger, via line 194, informs mapping feeds process 230 that the file has been provided by CADB system 138. Mapping feeds process 230 then maps the different representations of the switch name and provides that as an operator message, via line 222, to the operator. From this, errors may be generated. Furthermore, the data is provided to a store or a memory entitled state country mapping, designated as 236. Store 236 is a database file in database 120.

Figure 11:
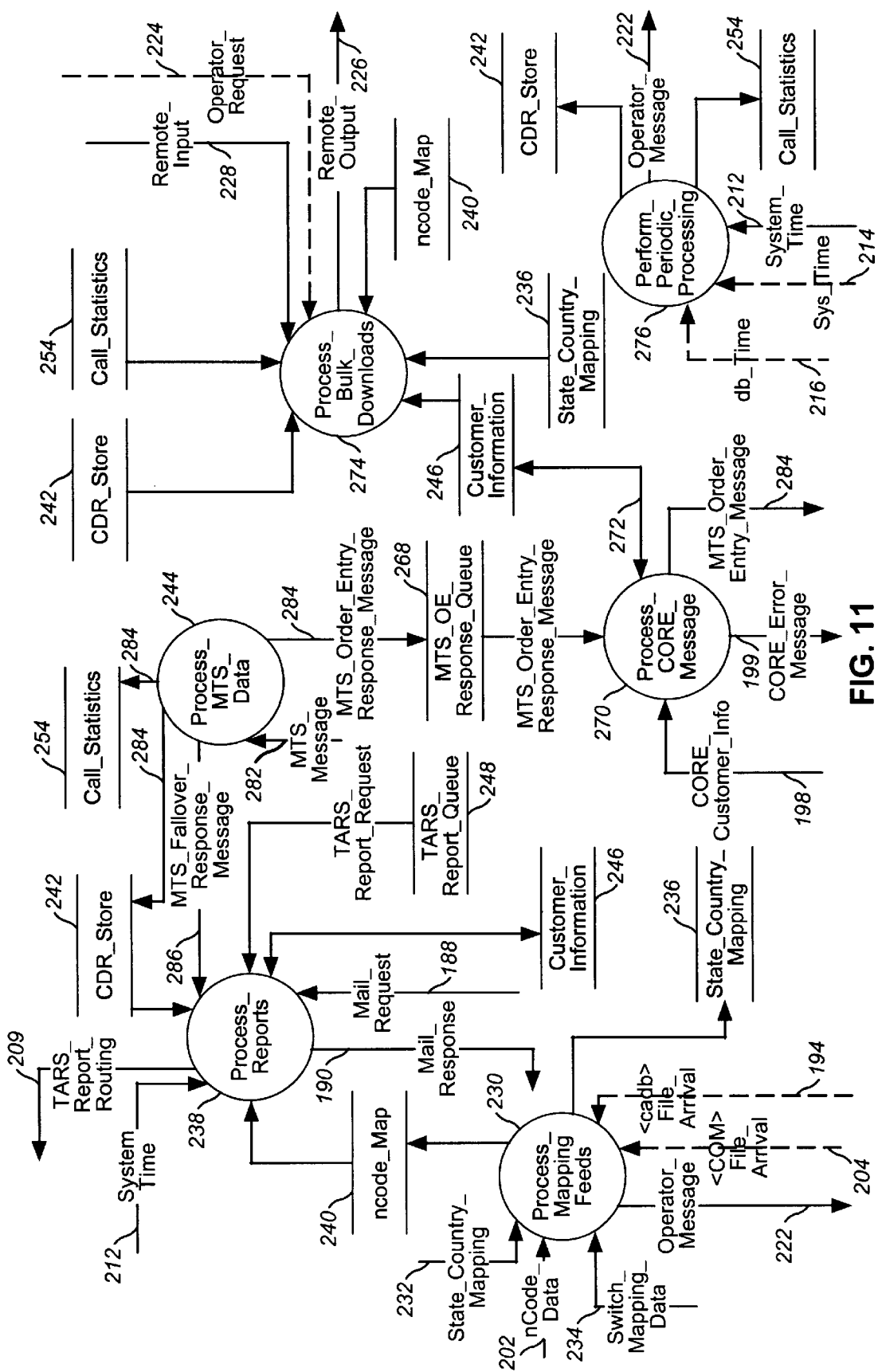
FIG. 11 is a functional diagram illustrating the major functional areas of the TVS system.

The next process that the TVS server performs is the reports process, designated 238 in FIG. 11. As its name implies, process 238 generates, upon request, on a periodic basis, a number of reports. The different functions performed by the reports process 238 will be further elaborated in FIG. 12. It should be noted that there are a number of inputs, namely a system time provided by host system 210, via line 212, and a mail request provided by CADB system 238, via line 188, to the reports process 238. Also provided from an ncode map store 240 is an ncode map and from a CDR store 242 the requisite CDRs. Ncode map store 240 is a file which stores the different ncode maps as processed by the mapping feeds process 230. CDR store 242 is a file that includes CDRs that were fed thereto by the process performed by MTS system 112, as indicated per MTS data process 244.

Also provided as inputs to reports process 238 are data from a customer information store 246 and a TVS report queue 248. Customer information store 246 provides information about the subscribers, the type of reports that they have ordered, the special service numbers that should be on the report and the frequency that the report should be generated, etc. TVS report queue 248 provides a buffer whereby the requested reports may be processed one at a time. Not shown, but should be understood being provided to reports process 238, is a call statistics store which allows process 238 to generate reports directly from call statistics as well as the CDR records retrieved from CDR store 242. When a report is generated, process 238 outputs the report, via line 209, to the StarWRS Inbox 370, in the format requested by the subscriber. Instead of reports, call statistics and CDR records may be retrieved and displayed, as screen formats, for subscribers of RTM system 117 in real time.

Figure 12:
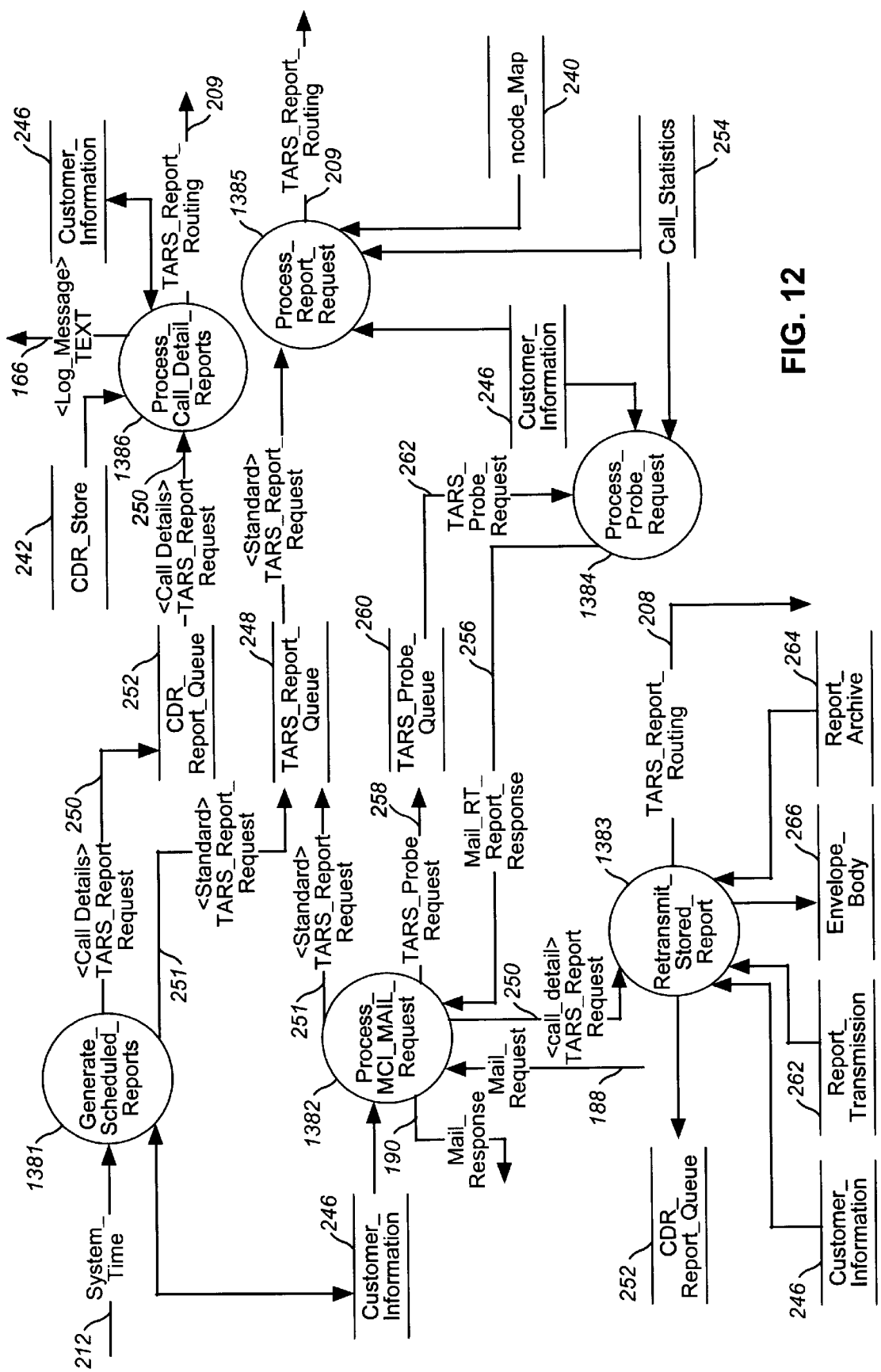
FIG. 12 is a diagram illustrating the various reports being provided by the process report function of the TVS system.

FIG. 12 illustrates the different types of reports processes that are performed in report process 238. As shown, scheduled reports are generated by subprocess 1381. It is by this process that regularly scheduled reports are generated, per input of system time by the host system via line 212. Shown also being provided as an input to the scheduled report generation subprocess 1381 is the information from the subscriber fed from customer information store 246. An output from the scheduled reports subprocess 1381 is the CDR reports which are fed via line 250 to a CDR report queue 252. A standard TVS report request is routed via line 251 to TVS report queue 248.

The next subprocess under report process 238 is the mail request process 1382. In addition to receiving mail request via line 188, note that subprocess 1382 may also receive retransmission requests, discussed earlier. Further shown being provided as an input to mail request subprocess 1382 is the customer information from customer store 246 and a mail report response from a probe request subprocess 1384, via line 256. If there is more than one probe request, the additional requests are provided via line 258 to a TVS probe queue 260, which in turn forwards the queued request via line 262 to probe request subprocess 1384. A standard TVS report request from the mail request subprocess 1382 is fed via line 251 to the TVS report queue 248. A response is then provided by mail request subprocess 1382 to mail host 24 via line 190. Any call detail TVS report request is provided by mail request subprocess 1382 via line 250 to retransmit stored report subprocess 1383.

The stored reports may be sent to the CDR report queue 252, so that the reports are transmitted one at a time, via line 208, to StarWRS Inbox 370 for delivery to the various subscribers. The report being retransmitted per store report retransmit subprocess 1383 obtains its data from a customer information store 246, a report retransmission store 262 with information pertaining to where the report is to be retransmitted, and a report archive 264 from which a previously prepared report may be retrieved. The format of the report is generated in accordance with the envelope provided by envelope body store 266.

In the probe request subprocess 1384, to send a report response to mail request subprocess 1382, probe request subprocess 1384 retrieves data from the customer information store 246 and call statistics store 254.

In report request subprocess 1385, to perform the report request, subprocess 1385 retrieves the next TVS report request from TVS report queue 248, subscriber data from customer information store 246, call statistics data from call statistics store 254 and ncode map data from ncode map store 240. The generated TVS report is routed via line 209 to StarWRS Inbox 370.

The call detail reports subprocess 1386 is the last subprocess of report process 238. For this subprocess, data is retrieved from CDR store 242 and customer information store 246. Upon receipt of the latest TVS report request via line 250 from CDR report queue 252, call detail report subprocess 1386 generates the call detail report and sends it as comma delimited text, via line 266, to the host system for logging. In addition, the call detail report generated from subprocess 1386 is routed to StarWRS Inbox 370 via line 208, for further transmission to the requesting subscriber.

In further view of FIG. 11, an MTS data process 244 receives an MTS message from MTS system 112. It is here that data from MTS system 112 is processed to generate the CDRs and call statistics, which are fed via lines 284 to CDR store 242 and call statistics store 254, both residing in MTS system 112. Any MTS fallover response message generated by MTS data process 244 is fed via line 286 to MTS system 112. The MTS order entry response message from MTS data process 244 is loaded to a MTS response queue 268, before the message is fed one at a time to call message process 270.

Call message process 270 retrieves subscriber information from customer information store 246 via line 272 and any additional subscriber information provided by the subscriber via the client workstation, such as PC 144 shown in FIG. 6, via line 198. Any CORE error message produced by CORE message process 270 is provided via line 299 to CORE system 142. The MTS order entry message is provided via line 284 to MTS system 112.

Another process performed by the TVS server is the bulk download process 274. Here data is retrieved from CDR store 242, CORE statistics store 254, customer information store 246, state country mapping store 136 and ncode map store 240. All of that information is retrieved in response to the remote input via line 228 from a remote subscriber at a computer workstation. Bulk download process 274 begins its operation upon receipt of the trigger 224 from the operator 220. Output from process 274 is provided via line 209 to the Inbox server 370 (FIG. 7). Note that this bulk download of a statistics file from the TVS server is different from the real time communications process between a subscriber workstation and RTM system 117. For the former, a single file comprising the requested information which spans a given period of time is downloaded. On the other hand, if the subscriber workstation is linked up with RTM system 117, a real time display of the statistics relating to the calls of the subscriber is provided.

One last function performed by the TVS server that is a stand alone function is the perform periodic processing process 276. Process 276 performs predetermined maintenance and housekeeping chores. As inputs, it retrieves data from CDR store 242 and call statistics store 254, as well as system time from host system 210. Upon receipt of the triggers from lines 216 and 214, for example each night, the data retrieved from CDR store 242 and call statistics store 254 are updated and restored in the respective stores. A message is provided to the operator via line 222. System time 214 notifies process 276 to clean up the files of the system, while DB time 216 informs processing 276 to begin the database maintenance operation.

In the preferred embodiment, when a subscriber subscribes to the RTM option, he/she is given a password which enables him to log onto RTM system 117. Once logged on, a subscriber can retrieve various statistics and view in real time those statistics and therefore the operation of the network, at least with respect to his special service call number(s).

Figure 13:
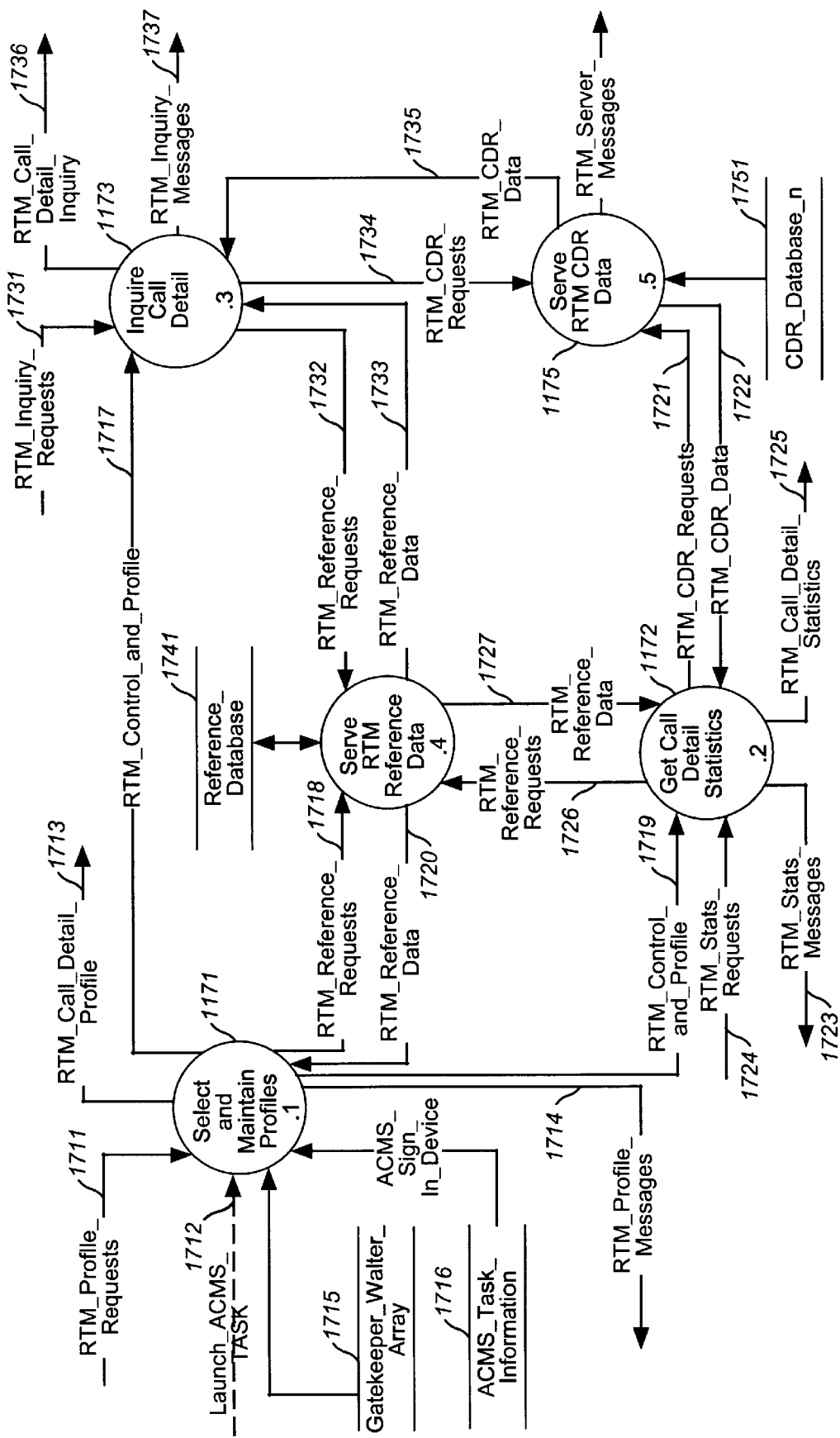
FIG. 13 is a diagram illustrating the major functional processes of the RTM system of the instant invention.

With respect to RTM system 117 and particularly the retrieval of call detail records statistics therefrom by a remote subscriber work station, refer to FIG. 13. Assume the remote subscriber's computer is equipped with a modem and the I/O ports of RTM system 117 are likewise equipped.

With reference to FIG. 13, the functional processes that take place in RTM system 117, or the real time monitoring (RTM) system, are shown to comprise five major functions. They are: select and maintain profiles process 1171, get call detail statistics process 1172, inquire call detail process 1173, serve RTM reference data 1174 and serve RTM CDR data 1175. A number of inputs and outputs connect the different processes together to provide the operation of RTM system 117. As will be shown later, some of the processes interact with databases of the system.

Shown connected to select and maintain profiles process 1171 is a RTM profile request input 1711, a launch ACMS task input 1712, a RTM call detail profile output 1713 and a RTM profile messages output 1714. Also shown to be connected to process 1171 are a gatekeeper waiter array store 1715 and an ACMS task information store 1716. In addition, outputting from process 1171 are a RTM controller and profile output 1717 to inquire call detail process 1173, a RTM reference request output 1718 to serve RTM reference data process 1174 and a RTM control and profile output 1719 to get call detail statistics process 1172. A RTM reference data line 1720 connects process 1171 to serve RTM reference data process 1174.

Although not shown, input 1711, as well as outputs 1713 and 1714 are routed to or from the RTM Web server 52 (FIG. 6). In other words, RTM profile requests are input to select and maintain profile process 1171 via line 1711 while outputs from process 1171 are provided as RTM call detail profiles and RTM profile messages to the user's terminal via line 1713 and 1714, respectively. Line 1712 provides to process 1171 an application control and management system (ACMS) that acts as an operating environment for the system. Specifically, when a RTM profile request is input to select and maintain profiles process 1171, a list of profiles for that subscriber is displayed to the subscriber. This is provided from process 1171 to either of outputs 1713 or 1714. When a RTM profile request is made, an ACMS task is launched from line 1712 to create an ACMS environment overlaying the operating system of RTM system 117. The ACMS environment provides the user with specific attributes that facilitate the operation of the system. For example, the environment may limit the system to no more than 50 users in order to be able to keep track of what the various users are doing. It moreover provides coordination for the system in order to enable the system to better handle the various inputs/outputs.

A subscriber accessing the system over the Internet via RTM web server 52 logs on to the RTM system via an Internet service provider in the manner as disclosed in above-mentioned, U.S. patent application Ser. No. 09/159,695 entitled "INTEGRATED CUSTOMER INTERFACE FOR COMMUNICATIONS NETWORK MANAGEMENT." Once an RTM profile request is made by a subscriber, as mentioned before, the system is enveloped by the ACMS environment in response to the particular identifier associated with the RTM request. Specific information such as a particular profile information is retrieved from gatekeeper waiter array store 1715 for responding to an input request. Thus, gatekeeper waiter array store 1715 includes information of the RTM subscribers and allocates a unique identifier for each of the subscribers of the RTM system. Additional data is retrieved by process 1171 from an ACMS task information store 1716 for identifying the type of device used by the subscriber so that a particular output format may be provided to the subscriber. The ACMS environment in effect handles or controls the user's sign-in and how they are handled once they are logged on.

Once a subscriber has logged on, his input device having been identified and the profile request received, process 1171 may output to the subscriber RTM profile messages via line 1714. These RTM profile messages present the user with a list of the actual profiles that the user has created and stored. In the instance where a user has not stored any profiles, the RTM profile messages presented to the user will request the user to create a new profile. Thus, as its name implies, process 1171 enables a subscriber to manage all of his profiles by either adding, deleting or changing any of his profiles.

As shown, RTM reference data is requested by select and maintain profiles process 1171 from serve RTM reference data process 1174 via line 1718. Upon receipt of a RTM request, process 1174 will retrieve from its reference database store 1741 the requested reference data and provide this reference data, which relates to the subscriber who requested the data, to process 1171 as RTM reference data via RTM reference data line 1720. As will be discussed subsequently, reference database store 1741 is responsive to both storing and retrieving requests from processes other than process 1171. Some of the information that are stored in reference database store 1741 include the order entry information for a particular customer or subscriber, and all of the 800 number information relating to a subscriber such as which 800(s) a subscriber has ordered. Note that the actual 800 call information, in the form of call detail records, are stored in the CDR database store 1751, which will be discussed, infra. Thus, process 1174 in essence maintains RTM reference data, by either updating or deleting it, and storing any updated or new RTM reference data into reference database store 1741.

If a subscriber wants to activate a given profile and to monitor the actual CDR records, a RTM control and profile request is sent from process 1171 to get call detail statistics process 1172. Process 1172, upon receipt of the RTM control and profile request, communicates with serve RTM CDR data process 1175 by outputting a RTM CDR request via line 1721. Serve RTM CDR data process 1175, in response to the RTM CDR request from process 1172, retrieves the appropriate data from the appropriate database of CDR database stores 1751. The thus retrieved CDRs stored in CDR database store 1751 for the particular 800 number are counted for the time frame that has been requested. The profile for the particular 800 that a subscriber wants to see is then retrieved by process 1175 and routed to process 1172 as RTM CDR data by means of line 1722. This retrieved RTM CDR data is next displayed to the subscriber as either RTM statistics messages via line 1723 if a RTM statistics request from line 1724 is received, or as RTM call detail statistics output to line 1725. The call detail statistics are displayed to the subscriber in a substantial real time basis, insofar as the polling interval can be set to vary from one minute to sixty minutes in increments of one minute. In other words, a subscriber, when viewing the call detail statistics, will see continuous changes for every polling time interval.

If a RTM inquiry request is input to RTM system 117 such as from line 1731, given the RTM control and profile provided from process 1171 via line 1717, the inquiry call detail process 1173 will request the RTM reference data from service RTM reference data process 1174 via line 1732. The relevant reference data is retrieved from reference database store 1741 and provided by process 1174 as RTM reference data to inquire call detail process 1173 via line 1733. Given the RTM reference data and the appropriate RTM control and profile, process 1173 sends a RTM CDR request to service RTM CDR data process 1175 via line 1734. Process 1175, upon receipt of the RTM CDR request, similar to its response to such request from process 1172, retrieves from CDR database store 1751 the CDR statistics for the particular profile and routes this as RTM CDR data to process 1173 via line 1735. Process 1173, upon receipt of the RTM CDR data, displays it as a call detail screen to the subscriber. This output is provided as either a RTM call detail inquiry screen to the subscriber via line 1736 or as RTM inquiry messages via line 1737.

For RTM system 117, therefore, different outputs may be provided to a subscriber, depending on what the subscriber requests. If the subscriber requests call details, then a web page comprising a call detail statistics screen is provided by process 1173 to the subscriber. On the other hand, if the subscriber wants to monitor the real time operation of the network, he will request such and get call detail aestatistics process 1172 will provide call detail statistics screen to the subscriber. By observing the various screens, a subscriber can therefore monitor whether any trend has occurred with the operation of the network. If there is, appropriate actions may be taken to rectify the problem or alter the trend.

As was mentioned previously, the call detail records are stored in CDR database store 1751. The reason that there are multiple CDR database stores is that each subscriber, irrespective of however many special service call numbers that he subscribes to, is assigned a specific CDR database. This is found to enhance the adding or changing of the special service call numbers, and the detail information for each of those numbers. These database stores are the same as the above mentioned relational databases disclosed in the aforenoted co-pending '186 application.

For RTM system 117, in operation, when a subscriber or user has selected a specific profile, that profile is initially associated with an inquire call detail or get call detail statistics. Either the get call detail statistics or the inquire call detail may be viewed by the subscriber at one time by either requesting from process 1172 or 1173, respectively. Thus, if a subscriber activates or selects a specific profile, that profile (or rather the designation or name associated with that profile) and a few other pieces of information are routed to get call detail statistics process 1172. Process 1172, upon receipt of the request, sends a RTM reference request to serve RTM reference data process 1174, which retrieves the RTM reference for that profile from reference database 1741. The RTM reference request from process 1172 is sent to process 1174 via line 1726. Once retrieved, the RTM reference data is sent by process 1174 to process 1172 via line 1727. Now that process 1172 has all of the reference information, it sends a RTM CDR request to serve RTM CDR data process 1175 requesting RTM CDR statistics. Process 1175, upon receipt of the request from process 1172, retrieves the appropriate information from CDR database store 1751 and transmits that RTM CDR data via line 1722 to process 1172 to be displayed for the user.

On the other hand, if the subscriber selects a profile that is initially associated with inquire call detail process 1173, the exact same thing as mentioned before occurs. That is, process 1173 requests the requisite RTM reference from process 1174. Upon retrieval of the appropriate reference data from reference database store 1741, process 1174 transmits that RTM reference data to process 1173. Thereafter, process 1173 sends the RTM CDR request to process 1175. The appropriate RTM CDR data is retrieved from the appropriate CDR database store 1751 and transmitted to process 1173. This retrieved RTM CDR data is then displayed to the subscriber.

As described, the present invention is integrated with a client and middle-tier service and application proxy component that enables customers to request, specify, customize, schedule and receive their telecommunications network call detail data in the form of reports that are generated by the various back-end application servers. Referred to as StarWRS, this WWW/Internet Reporting System 300, as shown in FIG. 7, comprises the following components and messaging interfaces:

1) those components associated with the Client GUI front end including a report requester client application 312, a report viewer client application 315 and, an Inbox client application 310 which implement the logical processes associated with a "Java Client," i.e., employs Java applets launched from the backplane (FIG. 3) that enable the display and creation of reports and graphs based on the fields of the displayed reports, and, allows selection of different reporting criteria and options for a given report; and, 2) those middle-tier server components enabling the above-mentioned reporting functionality including: a Report Manager server 350, a Report scheduler server 360, and an Inbox Server 370. Also shown in FIG. 7 are the system Order Entry client application 380 and a corresponding Order Entry Server 385 supporting the StarWRS reporting functionality as will be described.

Each of these components will now be described with greater particularity hereinbelow.

The Report Manager ("RM") server 350 is an application responsible for the synchronization of report inventory with back-end NFulfillingfl servers, i.e., TVS server 116; retrieval of entitlements, i.e., a user's security profiles, and report pick list information, i.e., data for user report customization options, from the system Order Entry server 380; the transmission of report responses or messages to the Dispatcher server 26 (FIG. 2); the maintenance of the reporting databases; and, the management of metadata used for displaying reports. In the preferred embodiment, the RM server 350 employs a Unix daemon that passively listens for connect requests from the GUI client applications and other back-end servers and deploys the TCP/IP protocol to receive and route requests and their responses. Particularly, Unix stream sockets using the TCP/IP protocol suite are deployed to listen for client connections on a well-known port number on the designated host machine. Client processes, e.g., report requester 312, desiring to submit requests connect to RM 350 via the dispatcher 26 by providing the port number and host name associated with RM 350. Request messages received by the RM server are translated into a "metadata" format and are validated by a parser object built into a report manager proxy 350' that services requests that arrive from the GUI front-end. If the errors are found in the metadata input, the RM 350 will return an error message to the requesting client. If the metadata passes the validation tests, the request type will be determined and data will be retrieved in accordance with the metadata request after which a standard response will be sent back to the requesting client. As shown in FIG. 7, interface sockets 352 are shown connecting the Dispatcher server 26 and the RM server 350 and, other socket connections 208, 356 are shown interfacing the RM 350 with respective back end servers 116 and 400. For instance, in one embodiment, fulfilling server 400 provides a customer's priced billing data through a Talarian smart socket messaging interface 356 to the Report Manager. Additionally, as part of the StarWRS web reporting system 300 shown in FIG. 7, unpriced traffic data may be sent directly to the report manager 350 from the Traffic View server 116, as described herein. Although not shown in FIG. 7, it should be understood that the RM 350 server may manage reporting data for customer presentation from other back-end and legacy servers including, e.g., Broadband, Toll Free Network Management, and Event Monitor servers, etc. in order to present to a customer these types of billing/management data.

The report manager server additionally utilizes a database 358, such as provided by Informix, to provide accounting of metadata and user report inventory. Preferably, an SQL interface is utilized to access stored procedures used in processing requests and tracking customer reports. A variety of C++ tools and other tools such as Rogue Wave's tools.h++ are additionally implemented to perform metadata message parsing validation and translation functions.

The Report Manager server 350 additionally includes the scheduling information which is passed to the back-end fulfilling servers 116, 400 and stored by them. At times, the Report Manager will request this information from the fulfilling servers in order to reconcile.

The Report Scheduler ("RS") server component 360 is, in the preferred embodiment, a perpetually running Unix daemon that deploys the TCP/IP protocol to send requests to the back-end fulfilling servers such as the StarODS (Perspective) server 400, or TVS server 116, and receive their responses. More particularly, the RS server 360 is a Unix server program that is designed to handle and process report requests to the fulfilling servers by deploying Unix stream sockets using the TCP/IP protocol suite, and sending the report request to client connections on a well-known port number on the designated host machine. As shown in FIG. 7, interface TCP/IP connections 364, 366 are shown interfacing with respective back end servers 400 and 116. In the case of priced billing data from Perspective Host 400, report requests are published by the RS server 360 to a pre-defined subject on the Talarian Server. When handling other incoming messages published by back end servers using Talarian SmartSockets 4.0, another daemon process may be necessary that uses Talarian C++ objects to connect their message queue and extract all messages for a given subject for storage in a database table included in database 363. Each message includes the track number of the report that was requested from the fulfilling server.

From the report scheduler interface, the user may specify the type of reporting, including an indication of the scheduling for the report, e.g., hourly, daily, weekly or monthly. For priced data the user has the option of daily, weekly, or monthly. For real-time, or unpriced data, the user has the option of hourly, daily, weekly or monthly. The report scheduler interface additionally may enable a user to specify a page or E-mail account so that an e-mail or page message may be sent to indicate when a requested report is in the Inbox server 370.

Figure 7:
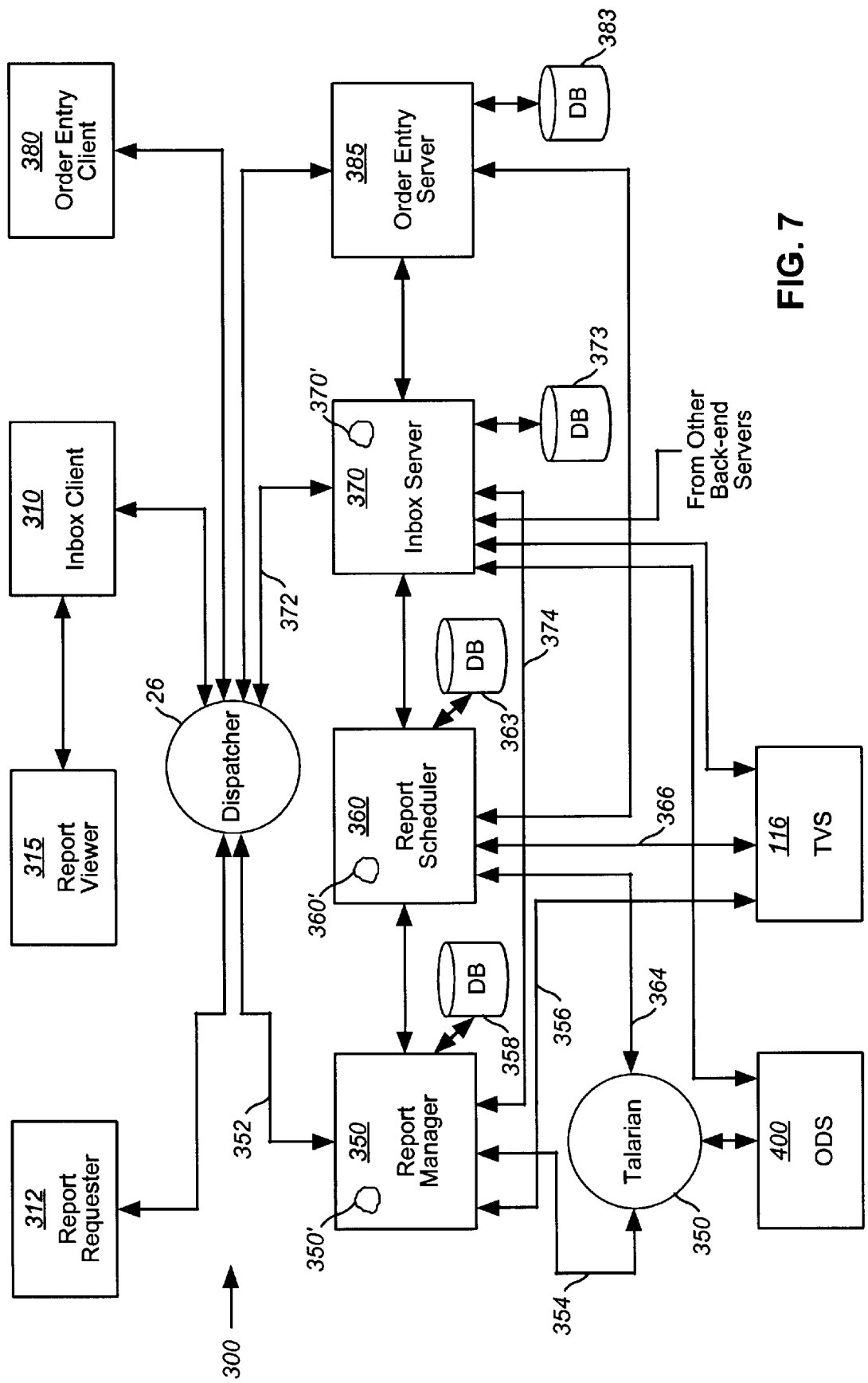
FIG. 7 is a block diagram depicting the physical architecture of the StarWRS component of the networkMCI Interact system.

As shown in FIG. 7, the report scheduler server 360 interfaces directly with the Report Manager server 350 to coordinate report request processing. It should be understood that the respective report management and scheduling functions colud be performed in a single server. An overview of the report request/scheduling process implemented by StarWRS Report Manager and Report Requestor tools may be found in commonly owned, U.S. patent application No. 09/159,409 entitled INTEGRATED PROXY INTERFACE FOR WEB BASED REPORT REQUESTOR TOOL SET, the contents and disclosur of which is incorporated by reference as if fully set forth herein.

The Inbox Server component 370 serves as the repository where the completed user report data is stored, maintained, and eventually deleted and is the source of data that is uploaded to the client user via the dispatcher over a secure socket connection 372. It is also a Unix program that is designed to handle and process user requests submitted in metadata format using an Informix database. Once report results are received from the TVS server 116 or any other back-end or fulfilling servers (not shown), the Inbox server 370 requests the metadata from the Report Manager server 350 as indicated by the socket connection 372 in FIG. 7. The metadata is stored in the Inbox server database 373 along with the report results. Thus, if the metadata is required to be changed, it will not interfere with the information needed to display the reports included in the Inbox. Additionally, as shown in FIG. 7, the Inbox server interfaces with the report scheduler to coordinate execution and presentation of reports.

The StarOE server 380 is the repository of user pick lists and user reporting entitlements as shown in database 383. Particularly, it is shown interfacing with the Inbox server 370 and report scheduler servers 360. The Report Manager does not interface with or include metadata for StarOE. It will, however, include information in the report metadata that will tell the Report Requestor it needs to get information (i.e., Pick Lists) from StarOE server 385. Particularly, the StarOE server supports pick lists for the selection of priced data based on the following list: Date, Time (Provide in GMT offset), ID Accounting Code (IDAC)/Supp code, Access Type, Corp ID, Service Location w/Service Location Names, Bill Payer w/Bill Payer Names, 8XX Number, City, State/Province, Numbering Plan Area (NPA), NXX (Exchange code where N=2–9 and X=0–9), and Country Code.

With regard to the front-end client GUI components, the above-mentioned Inbox client application 310 functions as an interface between the client software and the Inbox server 370 for presenting to the customer the various type of reports and messages received at the Inbox including all completed reports, call detail, alarms, and flashes. Preferably, the messages for the user in the inbox is sorted by type (e.g., report, call detail, alarms) and then by report type, report name, date, and time. A more detailed description of the StarWRS Inbox Server component may be found in commonly-owned, U.S. patent application Ser. No. 09/159, 512 entitled MULTI-THREADED WEB BASED USER IN-BOX FOR REPORT MANAGEMENT, the contents and disclosure of which is incorporated by reference as if fully set forth herein.

Particularly, the Inbox client application uses the services of the backplane (FIG. 3) to launch other applications as needed to process report messages. The inbox will also use the services of the data export objects to provide a save/load feature for inbox messages, and, is used to provide a user-interface for software upgrade/download control. Inbox messages are generated by the versioning services of the backplane; actual downloads will be accomplished by a request through the inbox.

In the preferred embodiment, the inbox client is able to receive information on multiple threads to allow a high priority message to get through even if large download is in progress. Typically, the browser is configured to allow more than one network connection simultaneously, i.e., the polling thread on the client uses a separate connection to check for new messages, and start a new thread on a new connection when a new message was detected. In this way, multiple messages may be downloaded simultaneously.

The Report Requestor application 312 is a GUI Applet enabling user interaction for managing reports and particularly includes processes supporting: the creation, deletion, and editing of the user's reports; the retrieval and display of selected reports; the display of selected option data; and the determination of entitlements which is the logical process defining what functionality a user can perform on StarWRS. In the preferred embodiment, a Report request may be executed immediately, periodically, or as "one-shots" to be performed at a later time. As described herein, the report scheduler service maintains a list of requested reports for a given user, and forwards actual report requests to the appropriate middle-tier servers at the appropriate time. Additional functionality is provided to enable customers to manage there inventory, e.g., reschedule, change, or cancel (delete) report requests.

The Report Viewer application 315 is a GUI Applet enabling a user to analyze and display the data and reports supplied from the fulfilling servers such as StarODS (perspective) 400, Traffic View 116, and other systems such as Broadband and toll free network manager. Particularly, the Report Manager 350 includes and provides access to the metadata which is used to tell the Report Requestor what a standard report should look like and the "pick-list" options the user has in order for them to customize the standard report. It is used to tell the Report Viewer client how to display the report, what calculations or translations need to be performed at the time of display, and what further customization options the user has while viewing the report. It additionally includes a common report view by executing a GUI applet that is used for the display and graphing of report data and particularly, is provided with spreadsheet management functionality that defines what operations can be performed on the spreadsheet including the moving of columns, column hiding, column and row single and multiple selection, import and export of spreadsheet data, and printing of spreadsheet, etc. It is also provided with report data management functionality by defining what operations can be performed on the data displayed in a spreadsheet including such dynamic operations as sorting of report data, sub-totaling of report data, etc. Furthermore, the report viewer 315 is provided with functionality enabling the interpretation of metadata; and, functionality enabling communication with the Backplane (FIG. 3). The report viewer application 315 is able to accept messages telling it to display an image or text that may be passed by one of the applications in lieu of report data (e.g., Invoice, Broadband report, etc.)

All reporting is provided through the Report Viewer interface which supports spreadsheet, a variety of graphic and chart types, or both types simultaneously. The spreadsheet presentation allows for sorting by any arbitrary set of columns. The report viewer 315 is launched from the inbox client 310 when a report is selected and may also be launched from the inbox when a report is selected.

By associating each set of report data which is downloaded via the Inbox server 370 with a "metadata" report description object, reports can be presented without report-specific presentation code. At one level, these metadata descriptions function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and subtotaling at an arbitrary number of levels. The same metadata descriptions can be used to provide common data export and report printing services. When extended to describe aggregation levels of data within reporting dimensions, it can even be used for generic rollup/drilldown spreadsheets with "just-in-time" data access.

The metadata data type may include geographic or telecommunications-specific information, e.g., states or NPAs. The report viewer may detect these data types and provide a geographic view as one of the graph/chart types.

The following list provides the types of requests that may be initiated by the Report Requestor 312 and the responses performed by the Report Manager 350: 1) Get/Send report template list—which request retrieves the list of all standard report templates for all products and is used only to obtain general report information, e.g., report title, description, etc.; 2) Get/Send report template detail—which request retrieves the details of a specific standard report template; 3) Get/Send user report list—which request retrieves the list of all user reports for the report format selected from a user report table and is used only as a request for general report information, e.g., report title, status, etc.; 4) Get/Send user report detail—which request retrieves the details of a specific user's report; 5) Add report definition/Acknowledgment—which requests addition of a user-created report to a user report table. If the report is a scheduled report, this request is also communicated to the fulfilling server at the time the report is due; 6) Delete report definition/Acknowledgment—which request deletes a user-created report from the user table; 7) Copy report definition/Acknowledgment—which request creates a duplication of the report the user is editing (other than the report title) and creates a new report ID for it; 8) Update Reporting Schedule/Acknowledgment—which request updates the scheduling information on a report without having to send a Delete and Add request; and, 9) Get Pick List/Acknowledgment— which request enables the Report Requestor 312 to get a pick list provided by StarOE server. A more detailed description of each of these types of metadata requests that may be initiated by the Report Requestor 312 and the responses performed by the Report Manager 350 can be found in above-mentioned, co-pending U.S. patent application Ser. No. 09/159,409.

As mentioned herein with respect to FIGS. 6 and 7, the TVS component 116 interfaces with StarWRS web reporting tool 300 for specific customer reporting requirements. As described, the Report Requester 360 communicates with the user client 301 and controls navigation and requests for customization criteria via the Web browser. The Report Requestor receives from StarOE any billing hierarchies and static pick lists needed by the client to customize report requests. Report request customizations are then passed to the Report Manager, which acts as repository of report requests, both ad hoc and recurring, that are submitted for processing by the client. Along with the necessary customization criteria selected for report customization, the Report Manager 350 stores metadata about the report request, including report format information, sort, and display specifics. The Report Manager is responsible for passing report requests to the back end DSS and data marts for processing, and provides the entity against which the list of report requests known to the data marts are validated.

The Inbox server component 370 is the store and forward repository of all completed reporting requests, requests for call detail data, and any communications to the customer. The TVS server call detail report process 1386 ships formatted data in a compressed comma delimited format ("CDF") to the Inbox. Customers are then responsible for retrieving their report data held in the Inbox.

Figure 16:
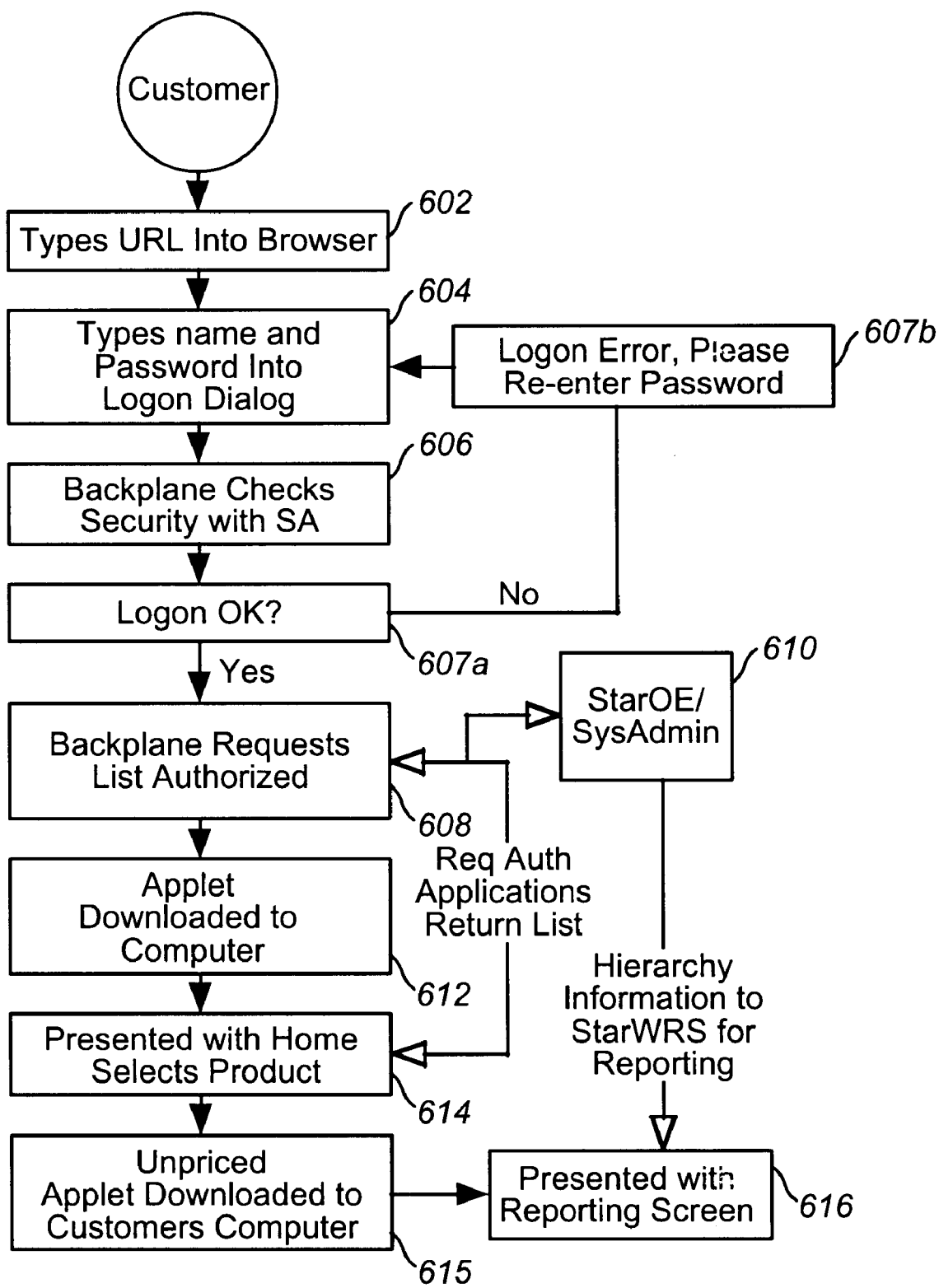
FIG. 16 is a block diagram illustrating the logon procedure for Internet access to the TrafficView and real-time traffic monitoring systems of the present invention.

As shown in the logon process flow diagram of FIG. 16, a customer first establishes communication with the DMZ Web server at step 602 and logs on to the nMCI Interact reporting system by entering the user's name and password onto a logon dialog box, as indicated at step 604. Having accessed the web page and logged in, a user Common Object is created. As indicated at step 606, an application running on the backplane directs a "Validate User Message" to the StarOE server 380 via the web server (FIG. 7) to direct the StarOE server 380 to perform security validation and authenticate the user ID and password in the manner as described in U.S. patent application Ser. No. 09/159,408, the contents and disclosure of which is incorporated by reference herein. It is understood that all communication to the StarOE server is via TCP/IP with a Unix process listening on a known TCP port. All data and security information is accessed by direct queries to a StarOE server database 283, such as provided by Informix.

Once the customer is validated, at steps 607a,b, the backplane objects request a list of all the authorized applications from the StarOE server, as indicated at step 608. Particularly, as described in U.S. patent application Ser. No. 09/159,515, now issued as U.S. Pat. No. 6,115,040, the contents and disclosure of which is incorporated by reference herein, a "Get User Application Request" message is communicated to the StarOE server via the backplane which queries the Informix database to obtain a list of authorized applications, i.e., services, for the user and which determines which buttons on the home page are active, thus controlling their access to products. At steps 610 and 612 respectively, a networkMCI Interact applet is downloaded to the customer's Web Browser via the established TCP/IP connection, and the browser presents the customer with the networkMCI Interact system home page, such as the exemplary home page 80 shown in FIG. 4. It should be understood that in the preferred embodiment, the icons for applications the user has security access to are shown bolded. Thus, it should be understood that if the customer subscribes to Unpriced Reporting, an Unpriced Reporting icon is automatically enabled when the home page appears.

Referring back to FIG. 16, at step 614, the customer selects the Unpriced Reporting application from the home page by clicking on a Report Requestor icon 76 (FIG. 4) after StarOE validates the user's id and password in the manner as described in U.S. patent application Ser. No. 09/159,408. The backplane object allows the user access to the Report Requestor front end if the user is so authorized. As shown at step 615, a client unpriced reporting application is downloaded to the customer who is presented with the unpriced reporting screen (not shown), as indicated at step 616. It is from this screen that the user has the option to create or modify the types and specify the frequency at which reports are to be delivered. The subscriber may also retrieve completed TVS reports residing in the Inbox by clicking on the Message center icon 77 (FIG. 4). Furthermore, the subscriber may access real-time traffic monitoring capability, e.g, viewing real-time network traffic statistics, by clicking on the traffic monitor icon 72 (FIG. 4).

Figure 14:
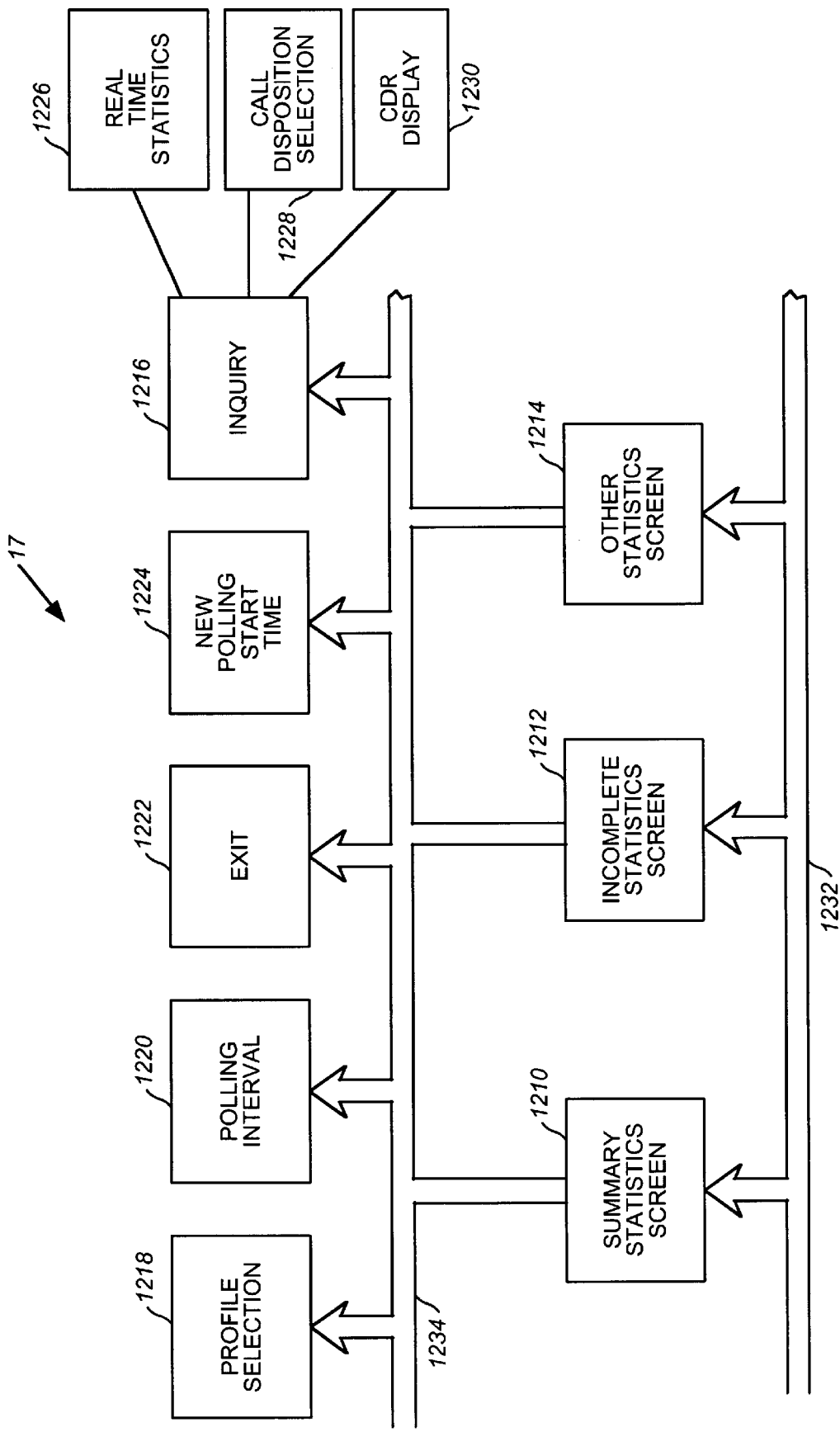
FIG. 14 is a diagram showing the interrelationship between the various screens of the RTM system.

In the preferred embodiment, for the real-time monitoring function, there are a number of web page display screens generated by the RTM system 117 that, in combination, provide the subscriber with the real time traffic statistics he/she desires. As shown in FIG. 14, these various screens are interconnected and, as will be shown later, are selectable by the subscriber. In particular, there is a summary statistics screen 1210, an incomplete statistics screen 1212, an other statistics screen 1214, an inquiry screen 1216, a profile selection screen 1218, a polling interval screen 1220, an exit screen 1222 and a new polling start time screen 1224. There are furthermore a real time statistics subscreen 1226, a call disposition subscreen 1228 and a CDR display so screen 1230 emanating from inquiry screen 1216.

To illustrate the interrelationship between the screens, note that summary statistics screen 1210, incomplete statistics screen 1212 and other statistics screen 1214 are interconnected, by a bus 1232. At the same time, those screens are also interrelated, per another bus 1234, to profile selection screen 1218, polling interval screen 1220, exit screen 1222, new polling start time screen 1224 and inquiry screen 1216. These screens, or subscreens (pop-up screens), are provided to the subscriber as web pages via a Web browser, e.g., Internet Explorer 4.0 or greater, which is part of the client Report viewer component of the StarWRS web reporting system as shown in FIG. 7.

RTM system 117 basically provides a subscriber the ability to see in near real time how the network is performing. The subscriber can see how many calls (directed to his call number(s)) are being attempted on a predetermined time period, as for example minute by minute. The subscriber furthermore can see how many of those calls are being allowed through the network, how many are incompletes, how many are blocked, etc. Furthermore, RTM system 117 provides subscribers the ability, if they decide to do so, to look up specific call records that made up a specific type of call. For example, if a subscriber sees an abnormal number of incompletes, assuming that ordinarily 5% of calls are incompletes, he can retrieve the call records that made up those incomplete calls to find out why those calls were incompletes. A screen for showing the various statistics is shown in FIG. 15(h).

The screen of FIG. 15(h) shows both current and total number of calls to a subscriber. This exemplar web page display screen of FIG. 15(h) shows that a subscriber started viewing in near real time the statistics of calls directed to his call numbers at 00:43, and that the current time is 19:38. The polling time interval is five minutes. Thus, the next screen that the subscriber sees will be at 19:43. As further shown in the exemplar screen of FIG. 15(h), the subscriber "DANTEST" has two special service call numbers, i.e. 123-4567 and 345-8789. It is assumed for this discussion that those numbers are 800 numbers. Both the current (C) and total (T) figures are shown. Thus, during the time period that the subscriber views the summary statistics screen, there were three attempts that were incompletes; and those incomplete calls were directed to call number 123-4567. Given the five minute interval, the next screen that the subscriber sees will be a screen that shows what occurred between 19:38 and 19:43.

Note that even though only two special service call numbers are shown, a subscriber can in actuality subscribe to a much greater number of special service call numbers. Note further that in addition to showing the number of attempts and incompletes, the FIG. 15(h) screen also shows "OTHER" which may be calls that were blocked or didn't get through because of the insufficient capacity in the network purchased by the subscriber, and "DTO" which is direct termination overflow that shows how many of the calls are rerouted when the network capacity for a specific route is either busy or over capacity. The DTO feature may be ordered by the subscriber. There is also a "DURATION" portion which shows the average and total durations, both in minutes and seconds.

Figure 15I:
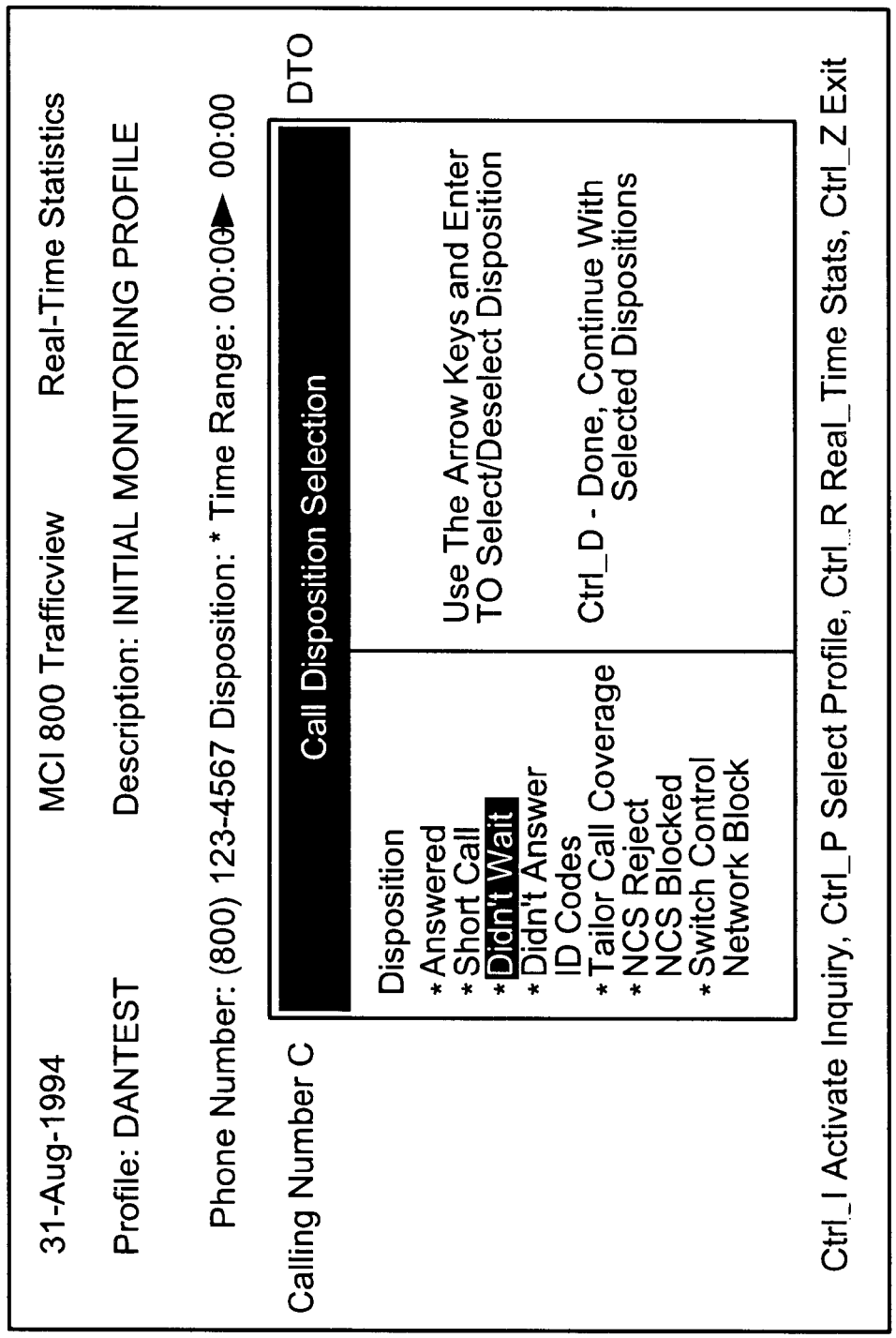
FIG. 15(i) is an exemplar incomplete summary screen.

At the bottom of the FIG. 15(h) screen, there are a number of options provided to the subscriber for exiting the exemplar screen of FIG. 15(h) and going to some other screen. For example, given that there are three incompletes shown on the summary statistics screen of FIG. 15(h), a subscriber may want to next view the incompletes statistics summary screen of FIG. 15(i).

Upon activation, incomplete statistics screen 1212 shows retrieved call detail records of the special service call numbers associated with the subscriber on the exemplar screen of FIG. 15(i). As before, a total of three incompletes are shown. These incompletes are further categorized as "short calls", which are calls that last less than three seconds. In other words, incomplete calls are in all likelihood calls directed to call number 123-4567 while that number was busy. The other two categories further elaborating incomplete calls are "didn't wait" and "didn't answer." A "didn't wait" call is chosen to be from 3–15 seconds which means that the phone rang for a while before the customer hung-up. A "didn't answer" incomplete call is one that lasts more than 15 seconds and means that there was probably no operator available to answer that incoming call. When a large number of blocks are shown in the incomplete summary web page display having an exemplar screen of FIG. 15(i), the subscriber can next proceed to another web page having a summary screen of FIG. 15(j) to determine the reason why a call is blocked.

As shown in FIG. 15(j), one of the reasons that a call is blocked is due to its ID codes. This is also known as subcode blocking and it is a type of call that a subscriber has configured. For example, a subscriber may require that a PIN (personal identification number) be required before a call is to be completed. Thus, an ID code blocked call is a blockage defined by the subscriber. The next type of blockage is a "tailor call coverage," also known as an out of band blockage. This is where a subscriber has purchased a special service call number such as a 800 number for only a given area in the country. For example assume a subscriber has subscribed to a 800 number only in the state of New Jersey. Anyone calling from outside that state is considered out of band and not in the "tailor call coverage." There is also an "equipment/network congestion" blockage. These are blocks defined by the management of the telecommunications network. For example, a switch may be congested, a line has failed, etc.

To determine where the incomplete calls are coming from, a subscriber can go to a call detail inquiry screen such as that shown in FIG. 15(k). The exemplar screen of FIG. 15(k) provides a list of all of the calls made to a particular special service number at a particular time range specified by the subscriber. It provides details about the call so that the subscriber can find out where the incomplete calls came from. An advantage provided by this screen is that the subscriber may call his customers back to find out additional information than what is displayed. FIG. 15(k) further shows that the time range requested by the subscriber is between 00:00 to 23:59, i.e. substantially the whole day. The call detail inquiry pertains to an 800 number, namely 123-4567. The calling number from which the incomplete call originated is (719) 282-1860. The country code of one designates the United States. The time it was connected to the network is shown to be Aug. 31, 1994 at 04:00 hour. The duration of the call was 12 seconds. The disposition of the call was that there was no answer. The DNIS designates a specific termination from a customer PBX, which is shown to be 123-3589. There is no DTO.

There are a number of call dispositions that are available to a subscriber. One of those is shown in FIG. 15(j). To select another call disposition or multiple call dispositions, the subscriber can select a call disposition selection screen such as that shown in FIG. 15(l). For the instant invention, there are 10 available call dispositions that a call can have. These include: answered, short call, didn't wait, didn't answer, ID codes, tailor call coverage, NCS reject, NCS blocked, switch control and network block. A subscriber can asterisk or highlight any one, a multiple or all of the call dispositions, for viewing. In other words, a subscriber selects the criteria for what is to be displayed on the screen. For the example shown in FIG. 15(l), a subscriber has chosen answer (completed calls), short calls, didn't wait, didn't answer, tailor call coverage, NCS reject and switch control calls. By selecting the different call dispositions, a subscriber sees different information relating to the calls.

One of such detailed displays is shown in the CDR detail display of FIG. 15(m). A pop-up screen thereat shows that the call was made from Colorado Springs, Colorado and that it was a short call. Additional information relating to each of the call dispositions may be added as seen fit.

So far, discussion has been had with the various screens which a subscriber can view with respect to calls directed to one or more of his special service call numbers. But before a subscriber can view the various screens, he needs to sign up with the TVS system 116, and more particularly subscribe to the RTM option.

When a subscriber first signs up with the network, a profile is established for him. Such profile selection screen is shown in FIG. 15(a). The subscriber can have as many profiles as he desires. Putting it differently, he may have one for monitoring all of his 800 numbers, one that monitors only one specific 800 number, one that monitors only five of his 800 numbers, etc. By inputting to the profile selection screen, a subscriber can select a given profile that he wants to use which defines the numbers that will be shown. In addition, the type of statistics look-up, or call inquires, that the subscriber wants may also be selected. New profiles may be created, while existing profiles can be updated.

FIG. 15(b) illustrates a screen by which a subscriber can add a profile. Suppose the subscriber has logged onto the system. He is prompted for his profile name which is shown by the exemplar FIG. 15(b) to be "testuser." The screen shows to the subscriber the polling interval, which for this example is five minutes. A description of the profile may also be provided. For example, the exemplar FIG. 15(b) profile screen shows that it is a test profile. So, too, a list of all of the special service numbers, for example 800 numbers, for the subscriber is shown. Selective 800 numbers shown on the screen of FIG. 15(b) can be monitored in greater details. See for example the four asterisked numbers of FIG. 15(b). To delete the display, the asterisk next to the number can be removed by simply toggling the number once the number has been highlighted with a cursor.

A profile may be deleted as shown in FIG. 15(c). Specifically, after the profile selection screen of FIG. 15(a) is retrieved, a key, for example CTRL-D is selected so that a pop-up screen appears. By moving the cursor, a particular profile would be deleted. As shown in FIG. 15(c), given that the subscriber has five different profiles, if he were to delete the profile "DANTEST", four other profiles remain.

To add a special call number, the exemplar screen shown in FIG. 15(d) is used. The add/delete profile phone numbers pop-screen is retrieved after the subscriber has entered into the adding a profile screen of FIG. 15(b). In addition to adding, special service phone numbers may also be deleted. If the number of special service call numbers exceeds the capacity of the screen, a subscriber can roll the screen to view the numbers outside of the view of FIG. 15(d).

A so-called top five numbers may be selected. This is shown in FIG. 15(e). The specific details and statistics relating to those numbers, once selected, are displayed on the statistics screens. Although only five numbers are shown to be selectable in FIG. 15(e), a higher or smaller number may also be selected. Once selected, those numbers are continuously displayed on the screen.

The polling interval may be changed. For example, the discussion so far pertains to a polling interval of 5 minutes. However, such polling period may be changed to 10 minutes, as shown in FIG. 15(f), or to a smaller predetermined period of time.

The start time for the polling interval likewise can be changed. This is shown in FIG. 15(g) in which the start time has been changed to 19:40.

By thus being able to monitor in substantially real time the operation of the network with respect to calls directed to call numbers the subscriber has subscribed to, a subscriber can quickly identify how efficiently his 800 numbers are being utilized. For example, suppose between 9:00 am and 10:00 am, an average of 100 calls per minute were received. Further assume that there were 200 operators on duty for the subscriber. Accordingly, half of those operators were not busy during that time period. On the other hand, between 3:00 pm and 4:00 pm there were only 50 operators on duty. Yet there were, on average, 400 calls per minute received during that period of time, resulting in a large number of incomplete calls. Once having that information, the subscriber can reallocate his resources, for example decreasing the number of operators in the morning and increasing the active operators in the afternoon. If it is found that there is a lot of blockage occurring, the subscriber can purchase additional capacity from the network.

Inasmuch as the present invention is subject to many variations, modifications and changes in detail, it is intended that all matter described throughout this specification and shown in the accompanying drawings be interpreted as illustrative only and not a limiting sense. Accordingly, it is intended that the invention be limited only by the spirit and scope of the appended claims.

What is claimed is:

1. A system for enabling an Internet enabled subscriber of a telecommunications network to monitor in substantially real time the operation of the telecommunications network, said system comprising:
   a) an Internet enabled subscriber work station to enable secure IP communications between said subscriber and a network of a telecommunications service provider;
   b) a server for authenticating said subscriber as being entitled to receive real time telecommunications network operation data;
   c) processor device for determining the call details of special service calls routed through said network;
   d) a traffic statistics apparatus including database device into which records of the call details determined from calls of various subscribers routed through said network are stored; and
   e) connection device in communication with said traffic statistics apparatus for downloading stored call detail records to said subscriber work station via said secure IP communications;
      whereby said subscriber work station displays to said subscriber the operation of said network as it relates to any special service number of said subscriber in substantial real time.

2. The system as claimed in claim 1, wherein the operation of said network being dislayed by said subscriber workstation comprises traffic statistics relating to said any special service call of said each subscriber.

3. The system as claimed in claim 1, further comprising:
   process for creating a profile for said each subscriber, said process communicating said subscriber profile information to said traffic statistics apparatus so that operation of said network is displayed to said each subscriber in accordance with said subscriber profile.

4. The system as claimed in claim 1, wherein the operation of said network is displayed to said each subscriber as web pages presenting displays having a number of reporting options that a subscriber can choose.

5. The system as claimed in claim 1, wherein the operation of said network being displayed at said subscriber workstation comprises a summary statistics screen, an incomplete statistics screen, another statistics screen and an inquiry screen that displays real time statistics and call detail records of any special service call for said subscriber.

6. A method for enabling a subscriber to monitor in substantially real time the operation of a telecommunications network at a subscriber workstation over the Internet, said method comprising the steps of:
   enabling secure Internet access between said subscriber and an enterprise server receiving a subscriber's call detail data pertaining to the routing of special service calls throughout the subscriber's telecommunications network, said call detail data being provided to said enterprise server according to subscriber's entitlements;
   authenticating said subscriber entitlement at the time of subscriber access to said enterprise server;
   retrieving and determining the call details of special service calls routed through said network;
   storing into a database device of said enterprise server records of the call details determined from calls of various subscribers routed through said network;

downloading from said database the call details of special service calls routed through said network to a subscriber workstation via the Internet; and displaying to said subscriber the operation of said network as it relates to any special service number of said subscriber in substantial real time.

7. The method of claim 6, wherein said displaying step further comprises the step of displaying to said subscriber traffic statistics relating to said any special service number of said each subscriber.

8. The method of claim 6, further comprising the step of:

creating an entitlement profile for said subscriber so that the operation of said network is displayed to said subscriber in accordance with said profile.

9. The method of claim 6, wherein said displaying step further comprises the step of displaying the operation of said network to said subscriber as web pages presenting a number of options that said subscriber can choose.

10. The method of claim 6, wherein said displaying step further comprises the step of:

displaying the operation of said network to said subscriber as a web page including any of a summary statistics screen, an incomplete statistics screen, an other statistics screen and an inquiry screen that displays real time statistics and call detail records of any special service call for said subscriber.

11. A method for enabling a subscriber of a telecommunications service provider to monitor the traffic of calls to at least one special service call number of said subscriber through the communications network of said telecommunications service provider, the monitoring being enabled at a subscriber workstation over the Internet, said method comprising the steps of:

enabling secure Internet access between said subscriber and an enterprise server receiving a subscribers call detail data pertaining to the routing of call traffic throughout the subscriber's telecommunications network, said call detail data being provided to said enterprise server according to subscriber's entitlements;

authenticating said subscriber entitlement at the time of subscriber access to said enterprise server;

generating call detail records of special service calls routed through said network;

storing the call detail records of said calls in a database device;

downloading from said database device the call details relating to stored call detail records of calls directed to any special service call number subscribed by said subscriber; and displaying said downloaded data at said subscriber workstation as various web pages, each web page capable of portraying a representation of the status of said calls being routed through said network in response to a particular request by said subscriber.

12. The method of claim 11, further comprising the steps of:

creating a profile for said subscriber; said displaying step further comprising the step of displaying to said subscriber said data in accordance with said customer's profile.

13. The method of claim 11, wherein said displaying step further comprises the step of:

displaying said retrieved data to said subscriber as traffic statistics relating to calls directed to said any special service call number of said subscriber.

14. The method of claim 11, wherein said displaying step further comprises the step of:

displaying said retrieved data to said subscriber as one or more web pages having screens comprising a number of options that said subscriber can choose.

15. The method of claim 14, wherein said screens include: a summary statistics screen, an incomplete statistics screen, an other statistics screen and an inquiry screen that displays real time statistics and call detail records of any special service call for said subscriber.

\* \* \* \* \*